United States Patent
Aoki et al.

(10) Patent No.: US 11,092,102 B2
(45) Date of Patent: Aug. 17, 2021

(54) SENSOR SYSTEM

(71) Applicant: TOYOTA JIDOSHA KABUSHIKI KAISHA, Toyota (JP)

(72) Inventors: Keiichiro Aoki, Sunto-gun (JP); Mie Kato, Susono (JP); Kazuki Takahashi, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 201 days.

(21) Appl. No.: 16/264,736

(22) Filed: Feb. 1, 2019

(65) Prior Publication Data

US 2019/0242320 A1 Aug. 8, 2019

(30) Foreign Application Priority Data

Feb. 8, 2018 (JP) .............................. JP2018-021016

(51) Int. Cl.
*G06G 7/70* (2006.01)
*F02D 41/14* (2006.01)
*F02N 11/08* (2006.01)

(52) U.S. Cl.
CPC ...... *F02D 41/1494* (2013.01); *F02N 11/0829* (2013.01); *F02N 11/0833* (2013.01); *F02N 2200/061* (2013.01); *F02N 2200/063* (2013.01)

(58) Field of Classification Search
CPC .............. F02D 41/1494; F02N 11/0829; F02N 11/0833; F02N 2200/061; F02N 2200/063
USPC .................................................. 701/102, 113
See application file for complete search history.

(56) References Cited

U.S. PATENT DOCUMENTS

| | | | |
|---|---|---|---|
| 6,781,098 B2* | 8/2004 | Toyoda | F02D 41/1481 123/697 |
| 7,189,948 B2* | 3/2007 | Kwon | F02D 41/1454 219/202 |
| 7,743,759 B2* | 6/2010 | Aoki | G05D 23/19 123/672 |

(Continued)

FOREIGN PATENT DOCUMENTS

DE   10 2012 208 955 A1   12/2012
EP   1 832 735 A2   9/2007

(Continued)

*Primary Examiner* — Hung Q Nguyen
*Assistant Examiner* — Anthony Donald Taylor, Jr.
(74) *Attorney, Agent, or Firm* — Oblon, McClelland, Maier & Neustadt, L.L.P.

(57) ABSTRACT

A sensor system for an engine for which an automatic stop-restart control is performed, the sensor system including: an exhaust gas sensor including a heater that heats a sensor element; and a control unit configured to: while the engine is stopped by the automatic stop-restart control, execute a preheat control of adjusting a temperature of the sensor element to a preheat temperature lower than an activation temperature; when an automatic start condition is satisfied, stop the preheat control and increase the temperature of the sensor element to the activation temperature; when an automatic stop condition is satisfied and a delay condition has not been satisfied, set the preheat temperature to a first temperature; and when the automatic stop condition is satisfied and the delay condition has been satisfied, set the preheat temperature to a second temperature higher than the first temperature.

7 Claims, 8 Drawing Sheets

(56) References Cited

U.S. PATENT DOCUMENTS

| | | | |
|---|---|---|---|
| 2007/0125348 A1* | 6/2007 | Aoki | F02D 41/061 |
| | | | 123/676 |
| 2007/0204840 A1* | 9/2007 | Abe | F02D 41/1494 |
| | | | 123/697 |
| 2009/0184105 A1* | 7/2009 | Hasegawa | H05B 1/0236 |
| | | | 219/497 |
| 2011/0147211 A1* | 6/2011 | Inagaki | G01N 27/4065 |
| | | | 204/406 |
| 2011/0155113 A1* | 6/2011 | Aoki | F02D 41/06 |
| | | | 123/672 |
| 2013/0006499 A1* | 1/2013 | Date | F02D 41/042 |
| | | | 701/104 |
| 2016/0290267 A1* | 10/2016 | Ide | F02D 41/2403 |

FOREIGN PATENT DOCUMENTS

| | | | | |
|---|---|---|---|---|
| JP | 2003-148206 | | 5/2003 | |
| JP | 2003148206 | * | 5/2003 | F02D 41/1494 |
| JP | 2011-007145 | | 1/2011 | |

* cited by examiner

SENSOR SYSTEM

INCORPORATION BY REFERENCE

The disclosure of Japanese Patent Application No. 2018-021016 filed on Feb. 8, 2018 including the specification, drawings and abstract is incorporated herein by reference in its entirety.

BACKGROUND

1. Technical Field

The disclosure relates to a sensor system that is applied to an internal combustion engine.

2. Description of Related Art

An exhaust gas sensor (an air-fuel ratio sensor, an oxygen sensor or the like) for detecting a particular component in exhaust gas is provided in an exhaust passage of an internal combustion engine. For maintaining a good exhaust emission, an operating state of the internal combustion engine is controlled based on the detection value of the exhaust gas sensor. The exhaust gas sensor includes a heater for heating a sensor element. Further, in the exhaust gas sensor, the sensor element is heated by the heater, and thereby, the sensor element is activated.

Japanese Patent Application Publication No. 2003-148206 (JP 2003-148206 A) discloses a technology about an internal combustion engine for which there is performed a control (hereinafter, also referred to as an "automatic stop-restart control") of automatically stopping the internal combustion engine when a predetermined automatic stop condition is satisfied and then automatically restarting the internal combustion engine when a predetermined automatic start condition is satisfied. In the technology disclosed in JP 2003-148206 A, the temperature of the sensor element of the air-fuel ratio sensor provided in the exhaust passage of the internal combustion engine is adjusted by controlling supply of electric power to the heater of the air-fuel ratio sensor. More specifically, while the internal combustion engine is automatically stopped, an electric power supply amount to the heater is decreased in the air-fuel ratio sensor, and thereby, the temperature of the sensor element is decreased to around a preheat temperature that is lower than an activation temperature. Thereafter, when the predetermined automatic start condition is satisfied, the temperature of the sensor element is increased to the activation temperature by the heater, in the air-fuel ratio.

SUMMARY

As shown in the technology disclosed in JP 2003-148206 A, in an internal combustion engine for which the automatic stop-restart control is performed, a preheat control is sometimes performed while the internal combustion engine is automatically stopped. The preheat control is a control of decreasing the electric power supply amount to the heater provided in the exhaust gas sensor and thereby adjusting the temperature of the sensor element to a preheat temperature that is lower than a predetermined activation temperature. By executing this preheat control, it is possible to restrain an unnecessary electric power supply to the heater of the exhaust gas sensor. As a result, it is possible to decrease electric power consumption of a battery that supplies electric power to the heater, and therefore, it is possible to restrain decrease in fuel efficiency.

In the case where the preheat control is performed while the internal combustion engine is automatically stopped, it is necessary to stop the execution of the preheat control and activate the sensor element of the exhaust gas sensor again, at the time of the restart of the internal combustion engine. On this occasion, even when the state of the exhaust gas sensor is in a normal range, in a state where the deterioration degree of the exhaust gas sensor is high to some extent, the increase speed of the temperature of the sensor element is lower than in a state where the deterioration degree of the exhaust gas sensor is low. Further, in a state where the charge amount of the battery when the sensor element is activated again is small, the increase speed of the temperature of the sensor element is lower than in a state where the charge amount of the battery is large. When the increase speed of the temperature of the sensor element becomes lower for these reasons, a period (hereinafter, also referred to as a "reactivation period") after the execution of the preheat control is stopped and before the temperature of the sensor element reaches the predetermined activation temperature increases. As a result, a period during which it is difficult to accurately control the operating state of the internal combustion engine based on the detection value of the exhaust gas sensor increases. Therefore, when the reactivation period after the stop of the execution of the preheat control excessively increases, there is concern of problems such as the deterioration in exhaust emission at the time of the restart of the internal combustion engine.

The disclosure provides a technology that makes it possible to restrain the deterioration in fuel efficiency in connection with the electric power supply to the heater of the exhaust gas sensor as much as possible in the internal combustion engine for which the automatic stop-restart control is performed, and to restrain an excessive increase in the reactivation period when the execution of the preheat control to the exhaust gas sensor is stopped at the time of the restart of the internal combustion engine.

A first aspect of the disclosure relates to a sensor system to be applied to an internal combustion engine for which an automatic stop-restart control is performed, the automatic stop-restart control being a control of automatically stopping the internal combustion engine when a predetermined automatic stop condition is satisfied and then automatically restarting the internal combustion engine when a predetermined automatic start condition is satisfied, the sensor system comprising: an exhaust gas sensor provided in an exhaust passage of the internal combustion engine, the exhaust gas sensor including: a heater that heats a sensor element; and a control unit configured to: i) while the internal combustion engine is stopped by the automatic stop-restart control, execute a preheat control of adjusting a temperature of the sensor element to a preheat temperature by decreasing an electric power supply amount to the heater, the preheat temperature being lower than a predetermined activation temperature; ii) when the predetermined automatic start condition is satisfied, stop execution of the preheat control and increase the temperature of the sensor element to the predetermined activation temperature; iii) in a case where the predetermined automatic stop condition is satisfied and where a predetermined delay condition has not been satisfied, set the preheat temperature in the preheat control that is executed in connection with a current execution of the automatic stop-restart control, to a predetermined first preheat temperature; and iv) in a case where the predetermined automatic stop condition is satisfied and where the predetermined delay condition has been satisfied, set the preheat temperature in the preheat control that is executed in connection with the current execution of the automatic stop-restart control, to a predetermined second preheat temperature that is higher than the predetermined first preheat temperature, wherein: the predetermined delay condition is a condition that a reactivation period from stop of the execution of the preheat control due to satisfaction of the predetermined automatic start condition is longer than a predetermined period when the control unit sets the preheat temperature to the predetermined first preheat temperature and executes the preheat control; and the reactivation period is a period from the stop of the execution of the preheat control due to the satisfaction of the predetermined automatic start condition to a time when the temperature of the sensor element reaches the predetermined activation temperature.

As described above, the reactivation period is a period from a time of the stop of the execution of the preheat control and to a time when the temperature of the sensor element reaches the predetermined activation temperature. Therefore, if the increase speed of the temperature of the sensor element after the stop of the execution of the preheat control is identical, the length of the reactivation period changes depending on the preheat temperature in the preheat control. That is, the reactivation period becomes shorter, as the preheat temperature in the preheat control becomes higher. However, the effect of the decrease in the electric power consumption of a battery, which is an effect to be obtained by the execution of the preheat control, becomes smaller, as the preheat temperature in the preheat control becomes higher.

Therefore, in the above aspect, the preheat temperature in the preheat control, which is executed in connection with the current execution of the automatic stop-restart control (that is, the current automatic stop-restart control executed in response to the satisfaction of the predetermined automatic stop condition), is changed depending on whether the predetermined delay condition has been satisfied when the predetermined automatic stop condition is satisfied. The predetermined delay condition is a condition that a reactivation period from stop of the execution of the preheat control due to satisfaction of the predetermined automatic start condition is longer than a predetermined period when the control unit sets the preheat temperature to the predetermined first preheat temperature and executes the preheat control. The predetermined period may be set to a period allowing the exhaust emission at the time of the restart of the internal combustion engine to be in a permissible range if the reactivation period is equal to or shorter than the predetermined period.

In a case where the predetermined automatic stop condition is satisfied and where a predetermined delay condition has not been satisfied, the control unit sets the preheat temperature in the preheat control that is executed in connection with a current execution of the automatic stop-restart control, to a predetermined first preheat temperature. On the other hand, in a case where the predetermined automatic stop condition is satisfied and where the predetermined delay condition has been satisfied, the control unit sets the preheat temperature in the preheat control that is executed in connection with the current execution of the automatic stop-restart control, to a predetermined second preheat temperature that is higher than the predetermined first preheat temperature.

In the case where the predetermined automatic stop condition is satisfied and where the predetermined delay condition has not been satisfied, the reactivation period after the stop of the execution of the preheat control is in the predetermined period, even when the control unit sets the preheat temperature to the predetermined first preheat temperature and executes the preheat control. Accordingly, it is possible to restrain an excessive increase in the reactivation period after the stop of the execution of the preheat control, even when the control unit sets the preheat temperature to the predetermined first preheat temperature and executes the preheat control. When the control unit sets the preheat temperature to the predetermined first preheat temperature and executes the preheat control, it is possible to increase the effect of the decrease in the electric power consumption, which is an effect to be obtained by the execution of the preheat control, compared to when the control unit sets the preheat temperature to the predetermined second preheat temperature and executes the preheat control. Accordingly, it is possible to further restrain the decrease in fuel efficiency in connection with the electric power supply to the heater of the exhaust gas sensor.

On the other hand, in the case where the predetermined automatic stop condition is satisfied and where the predetermined delay condition has been satisfied, when the control unit sets the preheat temperature as the predetermined second preheat temperature and executes the preheat control, it is possible to shorten the reactivation period after the stop of the execution of the preheat control, compared to when the control unit sets the preheat temperature to the predetermined first preheat temperature and executes the preheat control. Therefore, even in the case where the predetermined automatic stop condition is satisfied and where the predetermined delay condition has been satisfied, it is possible to restrain an excessive increase in the reactivation period after the stop of the execution of the preheat control. Accordingly, it is possible to restrain the occurrence of problems such as the deterioration in exhaust emission at the time of the restart of the internal combustion engine.

As described above, with the aspect, the preheat temperature in the preheat control is changed depending on whether the predetermined delay condition has been satisfied when the predetermined automatic stop condition is satisfied, and thereby, it is possible to restrain the deterioration in fuel efficiency in connection with the electric power supply to the heater of the exhaust gas sensor as much as possible, and to restrain an excessive increase in the reactivation period when the execution of the preheat control to the exhaust gas sensor is stopped at the time of the restart of the internal combustion engine.

In the above aspect, the predetermined first preheat temperature may be the preheat temperature in the preheat control executed in connection with a last execution of the automatic stop-restart control; and the predetermined delay condition may be a condition that the reactivation period from the stop of the execution of the preheat control is longer than the predetermined period in the last execution of the automatic stop-restart control.

In the case where the reactivation period after the stop of the execution of the preheat control (the last preheat control) executed in connection with the last execution of the automatic stop-restart control is longer than the predetermined period, there is a possibility that the deterioration degree of the exhaust gas sensor is high to some extent. In this case, when the preheat temperature in the preheat control (the current preheat control) to be executed in connection with the current execution of the automatic stop-restart control is set to the same temperature as the preheat temperature (the predetermined first preheat temperature) in the last preheat control, there is a possibility that the reactivation period after the stop of the execution of the current preheat control becomes longer than the predetermined period again.

Hence, as described above, the predetermined delay condition is set to the condition that the reactivation period after the stop of the execution of the last preheat control is longer than the predetermined period. On this occasion, in the case where the predetermined automatic stop condition is satisfied and where the predetermined delay condition has not been satisfied, that is, in the case where the reactivation period after the stop of the execution of the last preheat control is equal to or shorter than the predetermined period, the preheat temperature in the preheat control to be executed in connection with the current execution of the automatic stop-restart control is set to the same temperature as the preheat temperature (the predetermined first preheat temperature) in the last preheat control. On the other hand, in the case where the predetermined automatic stop condition is satisfied and where the predetermined delay condition has been satisfied, that is, in the case where the reactivation period after the stop of the execution of the last preheat control is longer than the predetermined period, the preheat temperature in the preheat control to be executed in connection with the current execution of the automatic stop-restart control is set to the second preheat temperature that is higher than the preheat temperature in the last preheat control. Thereby, it is possible to make the reactivation period after the stop of the execution of the current preheat control shorter than the reactivation period after the stop of the execution of the last preheat control. Accordingly, it is possible to restrain an excessive increase in the reactivation period after the stop of the execution of the current preheat control.

As the deterioration degree of the exhaust gas sensor becomes higher, the increase speed when the temperature of the sensor element is increased becomes lower, and therefore, the reactivation period is likely to become longer. Hence, in a case where the control unit sets the preheat temperature to the predetermined second preheat temperature and executes the preheat control, the control unit may set an increase amount of the predetermined second preheat temperature relative to the predetermined first preheat temperature to be larger, when the reactivation period from the stop of the execution of the preheat control in the last execution of the automatic stop-restart control is long, than when the reactivation period from the stop of the execution of the preheat control in the last execution of the automatic stop-restart control is short. Thereby, even when the deterioration degree of the exhaust gas sensor becomes higher, it is possible to restrain an excessive increase in the reactivation period. Therefore, even when the exhaust gas sensor further deteriorates, it is possible to make the reactivation period after the stop of the execution of the preheat control equal to or shorter than the predetermined period.

Further, the charge amount of the battery that supplies electric power to the heater sometimes influences the length of the reactivation period. That is, when the charge amount of the battery becomes smaller so that the voltage of the battery decreases, the increase speed when the temperature of the sensor element is increased by heating the heater becomes lower. Therefore, the reactivation period is likely to become longer, as the charge amount of the battery becomes smaller. Hence, in the above aspect, the control unit may be configured to: i) acquire a charge amount of a battery that supplies electric power to the heater; ii) in a case where the predetermined automatic stop condition is satisfied, where the predetermined delay condition has been satisfied and where the control unit sets the preheat temperature to the predetermined second preheat temperature and executes the preheat control, set the increase amount of the predetermined second preheat temperature relative to the predetermined first preheat temperature, based on the charge amount of the battery acquired when the predetermined automatic stop condition is satisfied in the current execution of the automatic stop-restart control in addition to a length of the reactivation period from the stop of the execution of the preheat control in the last execution of the automatic stop-restart control; and iii) set the increase amount of the predetermined second preheat temperature relative to the predetermined first preheat temperature to be larger, when the charge amount of the battery acquired when the predetermined automatic stop condition is satisfied in the current execution of the automatic stop-restart control is small, than when the charge amount of the battery acquired when the predetermined automatic stop condition is satisfied in the current execution of the automatic stop-restart control is large. Thereby, in the case where the deterioration degree of the exhaust gas sensor is high to some extent, it is possible to restrain an excessive increase in the reactivation period, even when the charge amount of the battery is relatively low.

Further, even when the exhaust gas sensor is in a normal state, as the charge amount of the battery becomes smaller, the increase speed when the temperature of the sensor element is increased becomes lower, so that the reactivation period is likely to become longer, as described above. Hence, A second aspect of the disclosure relates to a sensor system to be applied to an internal combustion engine for which an automatic stop-restart control is performed, the automatic stop-restart control being a control of automatically stopping the internal combustion engine when a predetermined automatic stop condition is satisfied and then automatically restarting the internal combustion engine when a predetermined automatic start condition is satisfied, the sensor system including: an exhaust gas sensor provided in an exhaust passage of the internal combustion engine, the exhaust gas sensor including a heater that heats a sensor element; and a control unit configured to: i) while the internal combustion engine is stopped by the automatic stop-restart control, execute a preheat control of adjusting a temperature of the sensor element to a preheat temperature by decreasing an electric power supply amount to the heater, the preheat temperature being lower than a predetermined activation temperature; ii) when the predetermined automatic start condition is satisfied, stop execution of the preheat control and increase the temperature of the sensor element to the predetermined activation temperature; iii) in a case where the predetermined automatic stop condition is satisfied and where a predetermined delay condition has not been satisfied, set the preheat temperature in the preheat control that is executed in connection with a current execution of the automatic stop-restart control, to a predetermined first preheat temperature; iv) in a case where the predetermined automatic stop condition is satisfied and where the predetermined delay condition has been satisfied, set the preheat temperature in the preheat control that is executed in connection with the current execution of the automatic stop-restart control, to a predetermined second preheat temperature that is higher than the predetermined first preheat temperature; and v) the control unit acquires a charge amount of a battery that supplies electric power to the heater, wherein the predetermined delay condition is a condition that the charge amount of the battery acquired when the predetermined automatic stop condition is satisfied in the current execution of the automatic stop-restart control is smaller than a predetermined charge amount. The predetermined charge amount is a charge amount at which the reactivation period after the stop of the execution of the preheat control becomes equal to or shorter than the predetermined period in the case where the exhaust gas sensor is in the normal state, where the charge amount of the battery is equal to or larger than the predetermined charge amount and where the control unit sets the preheat temperature to the predetermined first preheat temperature and executes the preheat control.

On this occasion, in the case where the predetermined automatic stop condition is satisfied and where the predetermined delay condition has not been satisfied, that is, in the case where the charge amount of the battery when the predetermined automatic stop condition is satisfied is equal to or larger than the predetermined charge amount, the preheat temperature in the preheat control to be executed in connection with the current execution of the automatic stop-restart control is set to the predetermined first preheat temperature. On the other hand, in the case where the predetermined automatic stop condition is satisfied and where the predetermined delay condition has been satisfied, that is, in the case where the charge amount of the battery when the predetermined automatic stop-restart condition is satisfied is smaller than the predetermined charge amount, the preheat temperature in the preheat control to be executed in connection with the current execution of the automatic stop-restart control is set to the predetermined second preheat temperature that is higher than the predetermined first preheat temperature. Thereby, it is possible to restrain an excessive increase in the reactivation period, even in the case where the charge amount of the battery when the predetermined automatic stop condition is satisfied is smaller than the predetermined charge amount.

Further, in the second aspect, the control unit may be configured to, in a case where the control unit sets the preheat temperature to the predetermined second preheat temperature and executes the preheat control, set an increase amount of the predetermined second preheat temperature relative to the first preheat temperature to be larger, when the charge amount of the battery acquired when the predetermined automatic stop condition is satisfied in the current execution of the automatic stop-restart control is small, than when the charge amount of the battery acquired when the predetermined automatic stop condition is satisfied in the current execution of the automatic stop-restart control is large. Thereby, it is possible to restrain an excessive increase in the reactivation period, even when the charge amount of the battery when the predetermined automatic stop condition is satisfied is smaller. Therefore, it is possible to make the reactivation period equal to or shorter than the predetermined period, even in the state where the charge amount of the battery is smaller.

A third aspect of the present disclosure relates to a sensor system to be applied to an internal combustion engine for which an automatic stop-restart control is performed, the automatic stop-restart control being a control of automatically stopping the internal combustion engine when a predetermined automatic stop condition is satisfied and then automatically restarting the internal combustion engine when a predetermined automatic start condition is satisfied, the sensor system including: an exhaust gas sensor provided in an exhaust passage of the internal combustion engine, the exhaust gas sensor including a heater that heats a sensor element; and a control unit configured to: i) while the internal combustion engine is stopped by the automatic stop-restart control, execute a preheat control of adjusting a temperature of the sensor element to a preheat temperature by decreasing an electric power supply amount to the heater, the preheat temperature being lower than a predetermined activation temperature; ii) when the predetermined automatic start condition is satisfied, stop execution of the preheat control and increases the temperature of the sensor element to the predetermined activation temperature; iii) in a case where the predetermined automatic stop condition is satisfied and where a predetermined delay condition has not been satisfied, execute the preheat control in connection with a current execution of the automatic stop-restart control; and iv) in a case where the predetermined automatic stop condition is satisfied and where the predetermined delay condition has been satisfied, not execute the preheat control in the current execution of the automatic stop-restart control.

In the aspect, whether the preheat control is executed in connection with the current execution of the automatic stop-restart control is determined depending on whether the predetermined delay condition has been satisfied when the predetermined automatic stop condition is satisfied. In the third aspect, the predetermined delay condition may be a condition that a reactivation period from stop of the execution of the preheat control due to satisfaction of the predetermined automatic start condition is longer than a predetermined period when the control unit executes the preheat control; and the reactivation period may be a period from the stop of the execution of the preheat control due to the satisfaction of the predetermined automatic start condition to a time when the temperature of the sensor element reaches the predetermined activation temperature.

In the aspect, the control unit is configured to execute the preheat control in connection with the current execution of the automatic stop-restart control, only in the case where the predetermined automatic stop condition is satisfied and where the predetermined delay condition has not been satisfied. Therefore, also with the aspect, it is possible to restrain the deterioration in fuel efficiency in connection with the electric power supply to the heater of the exhaust gas sensor as much as possible, and to restrain an excessive increase in the reactivation period when the execution of the preheat control to the exhaust gas sensor is stopped at the time of the restart of the internal combustion engine.

In the above aspect, the predetermined delay condition may be a condition that the reactivation period from the stop of the execution of the preheat control in a last execution of the automatic stop-restart control is longer than the predetermined period. Thereby, in the case where the reactivation period after the stop of the execution of the last preheat control is longer than the predetermined period because the deterioration degree of the exhaust gas sensor is high to some extent, the preheat control is not executed in the current execution of the automatic stop-restart control.

In the third aspect, the control unit may be configured to acquire a charge amount of a battery that supplies electric power to the heater; and the predetermined delay condition may be a condition that the charge amount of the battery acquired when the predetermined automatic stop condition is satisfied in the current execution of the automatic stop-restart control is smaller than a predetermined charge amount. Thereby, in the case where the charge amount of the battery is insufficient when the predetermined automatic stop condition is satisfied, the preheat control is not executed in the current execution of the automatic stop-restart control.

With the disclosure, in the internal combustion engine for which the automatic stop-restart control is performed, it is possible to restrain the deterioration in fuel efficiency in connection with the electric power supply to the heater of the exhaust gas sensor as much as possible, and to restrain the deterioration in exhaust emission at the time of the restart of the internal combustion engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, specific embodiments of the disclosure will be described based on the drawings. Unless otherwise mentioned, it is not intended that the technical scope of the disclosure is limited only to dimensions, materials, shapes, relative arrangements and the like of constituent elements described in the embodiments.

First Embodiment

Figure 1:
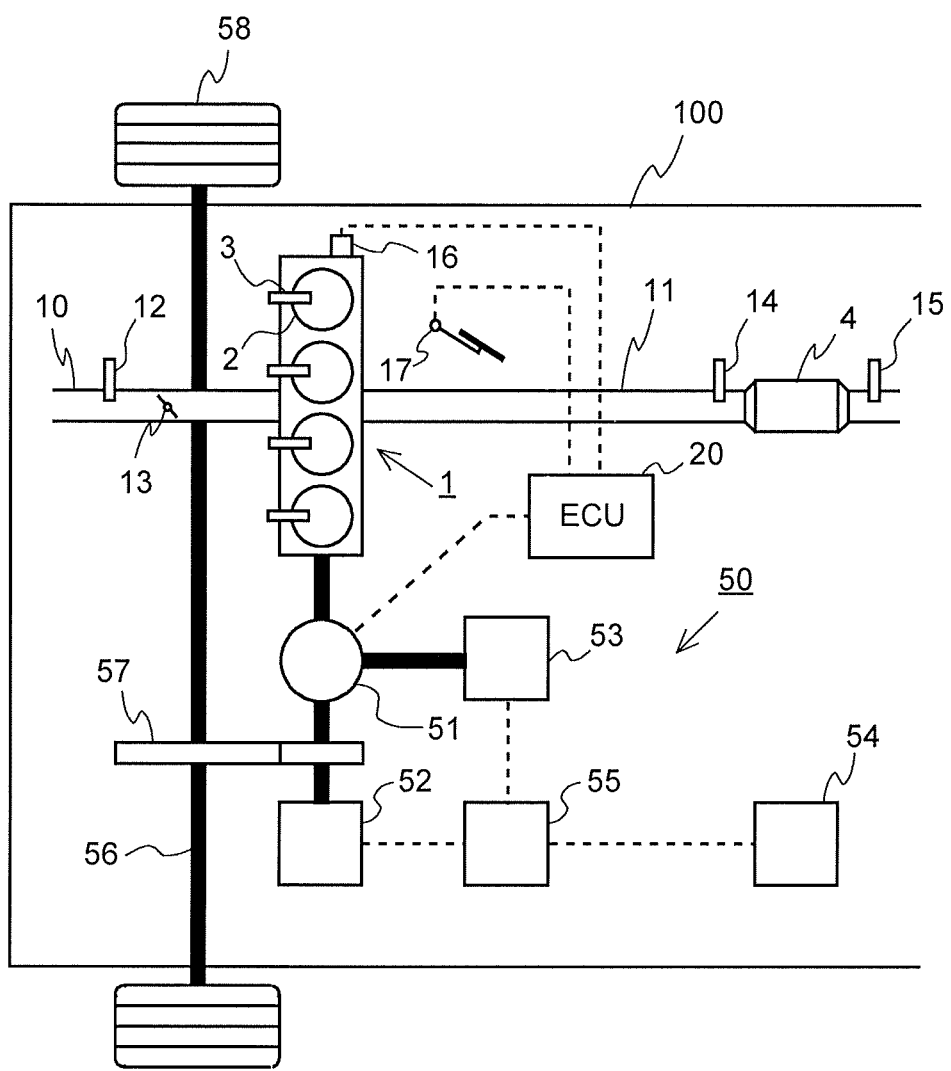
FIG. 1 is a diagram showing a schematic configuration of a hybrid system and an intake and exhaust system of an internal combustion engine according to an embodiment.

Schematic Configuration of Hybrid System and Intake and Exhaust System of Internal Combustion Engine An embodiment in which a sensor system according to the disclosure is applied to an internal combustion engine constituting a hybrid system will be described. FIG. 1 is a diagram showing a schematic configuration of a hybrid system and an intake and exhaust system of an internal combustion engine according to an embodiment. A hybrid system 50 mounted on a vehicle 100 includes an internal combustion engine 1, a power split device 51, an electric motor 52, an electric generator 53, a battery 54, an inverter 55 and a reduction gear 57. The reduction gear 57 is connected to an axle 56 of the vehicle 100. Wheels 58 are connected to both ends of the axle 56.

The power split device 51 splits output of the internal combustion engine 1 into the electric generator 53 and the axle 56. The electric generator 53 generates electric power, from dynamic power output by the internal combustion engine 1. Further, the power split device 51 has a function to transmit output of the electric motor 52 to the axle 56. The electric motor 52 rotates through the reduction gear 57, at a rotation speed proportional to the rotation speed of the axle 56. The battery 54 is connected to the electric motor 52 and the electric generator 53 through the inverter 55.

The inverter 55 converts direct-current power supplied from the battery 54, into alternating-current power, and supplies the alternating-current power to the electric motor 52. Further, the inverter 55 converts alternating-current power supplied from the electric generator 53, into direct-current power, and supplies the direct-current power to the battery 54. Thereby, the battery 54 is charged.

The hybrid system 50 configured as described above rotates the axle 56 using the output of the internal combustion engine 1 or the output of the electric motor 52. Further, the hybrid system 50 can rotate the axle 56, using both of the output of the internal combustion engine 1 and the output of the electric motor 52. That is, the hybrid system 50 uses both of the electric motor 52 and the internal combustion engine 1, as a dynamic power source of the vehicle 100. Furthermore, the hybrid system 50 can rotate a crankshaft of the internal combustion engine 1, using the output of the electric motor 52. That is, the hybrid system 50 can use only the electric motor 52, as the dynamic power source of the vehicle 100. Further, at the time of deceleration of the vehicle 100, the hybrid system 50 can operate the electric motor 52 as an electric motor, using rotational force of the axle 56, and thereby, can convert kinetic energy into electric energy, to collect the electric energy in the battery 54.

The internal combustion engine 1 is a gasoline engine. The internal combustion engine 1 includes four cylinders 2. Each cylinder 2 is provided with a fuel injection valve 3. The fuel injection valve 3 may be a fuel injection valve that injects fuel into an intake port of the cylinder 2, or may be a fuel injection valve that injects fuel directly into the cylinder 2. In the embodiment, the internal combustion engine 1 corresponds to the internal combustion engine according to the disclosure. The internal combustion engine according to the disclosure is not limited to a gasoline engine, and may be a diesel engine. An intake passage 10 and an exhaust passage 11 are connected to the internal combustion engine 1. The intake passage 10 is provided with an air flow meter 12 and a throttle valve 13. The air flow meter 12 detects the intake air amount of the internal combustion engine 1. The throttle valve 13 adjusts the intake air amount of the internal combustion engine 1.

The exhaust passage 11 of the internal combustion engine 1 is provided with an exhaust gas control catalyst 4. Examples of the exhaust gas control catalyst 4 include a three-way catalyst. The exhaust passage 11 is provided with an air-fuel ratio sensor 14, upstream of the exhaust gas control catalyst 4. The air-fuel ratio sensor 14 detects the air-fuel ratio of exhaust gas emitted from the internal combustion engine 1 (exhaust gas flowing into the exhaust gas control catalyst 4). As the air-fuel ratio sensor 14, for example, a limiting-current type oxygen sensor and an electromotive-force type oxygen sensor can be employed. Further, the exhaust passage 11 is provided with an exhaust gas temperature sensor 15, downstream of the exhaust gas control catalyst 4. The exhaust gas temperature sensor 15 detects the temperature of exhaust gas flowing out of the exhaust gas control catalyst 4.

Figure 2:
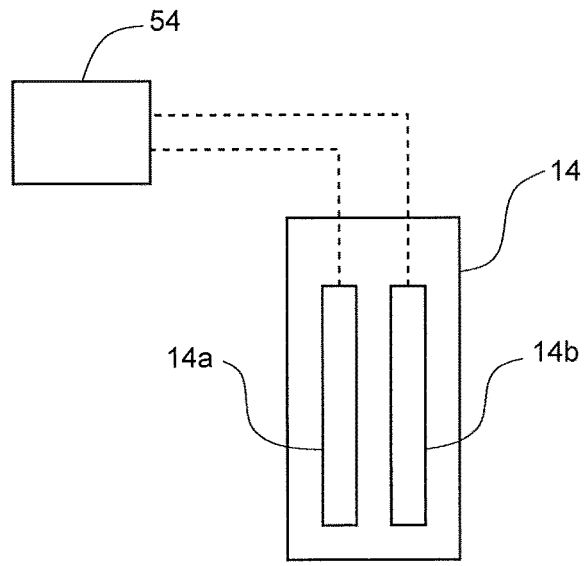
FIG. 2 is a diagram showing a schematic configuration of an air-fuel ratio sensor according to the embodiment.

A schematic configuration of the air-fuel ratio sensor 14 will be described based on FIG. 2. As shown in FIG. 2, the air-fuel ratio sensor 14 includes a sensor element 14a and a heater 14b. The sensor element 14a has a function to output a detection value corresponding to the air-fuel ratio of exhaust gas, in an activated state. The heater 14b has a function to heat the sensor element 14a. In the air-fuel ratio sensor 14, the sensor element 14a is heated by the heater 14b, and thereby, the sensor element 14a is activated. The sensor element 14a and the heater 14b are electrically connected to the battery 54. From the battery 54, electric power is supplied to each of the sensor element 14a and the heater 14b. During operation of the internal combustion engine 1, an electric power supply amount from the battery 54 to the heater 14b is controlled such that the temperature of the sensor element 14a is maintained at a predetermined activation temperature. In the embodiment, the air-fuel ratio sensor 14 corresponds to the exhaust gas sensor according to the disclosure. The exhaust gas sensor according to the disclosure is not limited to the air-fuel ratio sensor, and may be another sensor that detects a particular component in exhaust gas.

The hybrid system 50 includes an electronic control unit (ECU) 20. The air flow meter 12, the air-fuel ratios sensor 14 and the exhaust gas temperature sensor 15 are electrically connected to the ECU 20. Furthermore, a crank angle sensor 16 and an accelerator operation amount sensor 17 are electrically connected to the ECU 20. The crank angle sensor 16 detects a crank angle of the internal combustion engine 1. The accelerator operation amount sensor 17 detects an accelerator operation amount of the vehicle 100. Output signals of the sensors are input to the ECU 20. The ECU 20 calculates an engine rotation speed of the internal combustion engine 1 based on the detection value of the crank angle sensor 16. The ECU 20 calculates a required torque that is a torque to be required as a drive power of the vehicle 100, based on the detection value of the accelerator operation amount sensor 17. The ECU 20 controls the electric power supply amount from the battery 54 to the heater 14b, for maintaining the temperature of the sensor element 14a of the air-fuel ratio sensor 14 at the predetermined activation temperature. The temperature of the sensor element 14a is correlated with the impedance of the sensor element 14a. Hence, for example, the ECU 20 detects the impedance of the sensor element 14a, and controls the electric power supply amount to the heater 14b such that the detected impedance becomes a value corresponding to the predetermined activation temperature. By this control, it is possible to adjust the temperature of the sensor element 14a of the air-fuel ratio sensor 14 to the predetermined activation temperature.

Furthermore, during the operation of the internal combustion engine 1, the ECU 20 estimates the flow rate of the exhaust gas emitted from the internal combustion engine 1, based on the detection value of the air flow meter 12 and the fuel injection amount from the fuel injection valves 3. Further, the ECU 20 estimates the temperature of the exhaust gas control catalyst 4, based on the detection value of the exhaust gas temperature sensor 15. Further, the ECU 20 estimates a charge amount of the battery 54, by constantly integrating an electric power amount supplied to the battery 54 (an electric power amount generated by the electric generator 53 or the electric motor 52) and an electric power amount released from the battery 54 (an electric power amount consumed for drive of the electric motor 52, and the like). In the embodiment, the ECU 20 that estimates the charge amount of the battery 54 in this way corresponds to an example of the control unit according to the disclosure.

The electric motor 52, the power split device 51, the fuel injection valves 3 and the throttle valve 13 are electrically connected to the ECU 20. These devices are controlled by the ECU 20. For example, the ECU 20 controls the fuel injection amount from the fuel injection valves 3 such that the air-fuel ratio of the exhaust gas to be detected by the air-fuel ratio sensor 14 becomes a target air-fuel ratio close to the stoichiometric air-fuel ratio. The ECU 20 controls an operating state of the internal combustion engine 1 and a driving state of the electric motor 52, for example, based on the required torque calculated from the detection value of the accelerator operation amount sensor 17.

For example, the ECU 20 executes an automatic stop-restart control for the internal combustion engine 1. In the automatic stop-restart control, the ECU 20 automatically stops the internal combustion engine 1 when a predetermined automatic stop condition is satisfied during the operation of the internal combustion engine 1. Examples of the predetermined automatic stop condition include a condition that the required torque falls within a region in which the dynamic power source of the vehicle 100 is only the electric motor 52, during the operation of the internal combustion engine 1, and a condition that the vehicle 100 decelerates during the operation of the internal combustion engine 1. Furthermore, in the automatic stop-restart control, when the predetermined automatic start condition is satisfied after the internal combustion engine 1 is automatically stopped, the ECU 20 automatically restarts the internal combustion engine 1. Examples of the predetermined automatic start condition include a condition that the required torque falls within a region in which the dynamic power source of the vehicle 100 is the internal combustion engine 1, after the internal combustion engine 1 is automatically stopped, and a condition that the vehicle 100 accelerates after the internal combustion engine 1 is automatically stopped.

Preheat Control

While the internal combustion engine 1 is automatically stopped by the automatic stop-restart control, the fuel injection from the fuel injection valves 3 in the internal combustion engine 1 is stopped. Therefore, the air-fuel ratio sensor 14 does not need to detect the air-fuel ratio of the exhaust gas. Hence, in the embodiment, when the ECU 20 executes the automatic stop-restart control for the internal combustion engine 1, the ECU 20 executes a preheat control for the air-fuel ratio sensor 14.

As described above, during the operation of the internal combustion engine 1, the ECU 20 controls the electric power supply amount from the battery 54 to the heater 14b, such that the temperature of the sensor element 14a of the air-fuel ratio sensor 14 becomes the predetermined activation temperature. In the preheat control, while the internal combustion engine 1 is stopped by the automatic stop-restart control, the ECU 20 adjusts the temperature of the sensor element 14a of the air-fuel ratio sensor 14 to a preheat temperature that is lower than the predetermined activation temperature, by decreasing the electric power supply amount from the battery 54 to the heater 14b. By executing this preheat control, it is possible to restrain an unnecessary electric power to the heater 14b of the air-fuel ratio sensor 14. As a result, it is possible to decrease the electric power consumption of the battery 54 that supplies electric power to the heater 14b, and therefore, it is possible to restrain the deterioration in fuel efficiency. In the case where the ECU 20 executes the preheat control in connection with the execution of the automatic stop-restart control, the ECU 20 stops the execution of the preheat control and increases the temperature of the sensor element 14a to the predetermined activation temperature when a predetermined automatic start condition is satisfied. In the embodiment, the ECU 20 that executes the preheat control and stops the execution of the preheat control when the predetermined automatic start condition is satisfied as described above corresponds to an example of the control unit according to the disclosure.

Figure 3:
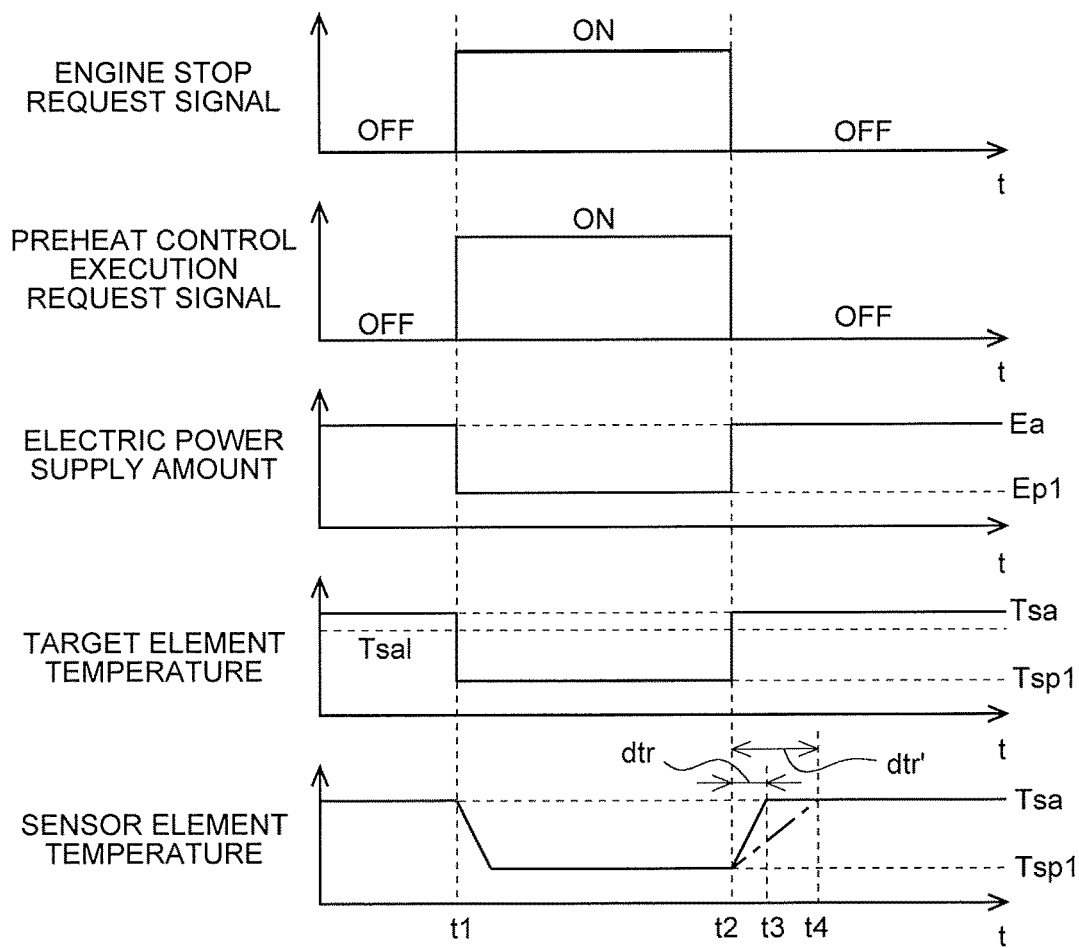
FIG. 3 is a time chart showing changes in an engine stop request signal, a preheat control execution request signal, an electric power supply amount from a battery to a heater, a target element temperature and a sensor element temperature when an automatic stop-restart control and a preheat control are executed.

Changes, when the automatic stop-restart control and the preheat control are executed, in an engine stop request signal, a preheat control execution request signal, the electric power supply amount from the battery 54 to the heater 14b, a target temperature (target element temperature) of the sensor element 14a and the actual temperature (sensor element temperature) of the sensor element 14a will be described based on a time chart shown in FIG. 3. In FIG. 3, until time t1, the internal combustion engine 1 is operated, and in the ECU 20, an engine stop request signal that is a signal for requesting the stop of the internal combustion engine 1 and a preheat control execution request signal for requesting the execution of the preheat control are both in the OFF state. Therefore, until time t1, the target element temperature is set to a predetermined activation temperature Tsa. The predetermined activation temperature Tsa is a temperature that is equal to or higher than a lower limit Tsa1 of the activation temperature of the sensor element 14a. Further, until time t1, the electric power supply amount from the battery 54 to the heater 14b is controlled to a predetermined activation supply amount Ea, and thereby, the sensor element temperature is maintained at a predetermined activation temperature Tsa. The predetermined activation supply amount Ea is an electric power supply amount to the heater 14b for adjusting the sensor element temperature to the predetermined activation temperature Tsa. In FIG. 3, the predetermined activation supply amount Ea until time t1 is a constant value. However, when the temperature of the exhaust gas flowing through the exhaust passage 11 (that is, the temperature of the exhaust gas to which the sensor element 14a is exposed) varies, the predetermined activation supply amount Ea for maintaining the sensor element temperature at the predetermined activation temperature Tsa changes in connection with the variation.

Then, when the predetermined automatic stop condition is satisfied at time t1, in the ECU 20, the engine stop request signal is turned ON. Thereby, the internal combustion engine 1 is automatically stopped. That is, the fuel injection from the fuel injection valves 3 in the internal combustion engine 1 is stopped. At time t1, in connection with the satisfaction of the predetermined automatic stop condition, the preheat control execution request signal is turned ON, in the ECU 20. Thereby, at time t1, the execution of the preheat control is started. Therefore, in FIG. 3, at time t1, the target element temperature is changed from the predetermined activation temperature Tsa to a predetermined first preheat temperature Tsp1 that is lower than the predetermined activation temperature Tsa. Therewith, at time t1, the electric power supply amount from the battery 54 to the heater 14b is decreased from the predetermined activation supply amount Ea to a predetermined first preheat supply amount Ep1. The predetermined first preheat supply amount Ep1 is an electric power supply amount of the heater 14b for adjusting the sensor element temperature to the predetermined first preheat temperature Tsp1. When the electric power supply amount to the heater 14b is decreased to the predetermined first preheat supply amount Ep1, the sensor element temperature starts to decrease. Then, when a certain amount of time has elapsed since time t1, the sensor element temperature becomes the predetermined first preheat temperature Tsp1.

Thereafter, in FIG. 3, at time t2, the predetermined automatic start condition is satisfied, and the engine stop request signal is turned OFF, in the ECU 20. Thereby, the internal combustion engine 1 is automatically restarted. That is, the fuel injection from the fuel injection valves 3 in the internal combustion engine 1 is restarted. Further, at time t2, in connection with the satisfaction of the predetermined automatic start condition, the preheat control execution request signal is turned OFF, in the ECU 20. Thereby, at time t2, the execution of the preheat control is stopped. Therefore, at time t2, the target element temperature is changed from the predetermined first preheat temperature Tsp1 to the predetermined activation temperature Tsa. Therewith, at time t2, the electric power supply amount from the battery 54 to the heater 14b is increased from the predetermined first preheat supply amount Ep1 to the predetermined activation supply amount Ea. Thereby, at time t2, the sensor element temperature starts to increase. On this occasion, at time t2, a certain amount of time is required from the stop of the execution of the preheat control to the time when the sensor element temperature reaches the predetermined activation temperature Tsa again. That is, when a reactivation period has elapsed since time t2, the sensor element temperature becomes the predetermined activation temperature Tsa.

In FIG. 3, at time t2, the operation of the internal combustion engine 1 is restarted. However, in a period from time t2 to a time when the reactivation period has elapsed, the sensor element temperature does not reach the predetermined activation temperature Tsa, and therefore, it is difficult to accurately perform the control of the operating state of the internal combustion engine 1 based on the detection value of the air-fuel ratio sensor 14. Accordingly, when the reactivation period from time t2, that is, the reactivation period after the stop of the execution of the preheat control excessively increases, there is concern of deterioration in fuel emission at the time of the restart of the internal combustion engine 1. In consideration of this point, in the case of performing the preheat control in connection with the execution of the automatic stop-restart control, it is necessary to restrain an excessive increase in the reactivation period after the stop of the execution of the preheat control. Therefore, in the preheat control, it is necessary to set the preheat temperature of the sensor element 14a such that the reactivation period when the execution of the preheat control is stopped becomes equal to or shorter than a predetermined period. On this occasion, the predetermined period is set to a period allowing the exhaust emission at the time of the restart of the internal combustion engine 1 to be in a permissible range if the reactivation period is equal to or shorter than the predetermined period.

In the time chart showing the change in the sensor element temperature after time t2 in FIG. 3, a change when the deterioration degree of the air-fuel ratio sensor 14 is low is shown by a solid line, and a change when the deterioration degree of the air-fuel ratio sensor 14 is high to some extent is shown by a dash-dot line. As shown by the solid line and the dash-dot line in FIG. 3, when the deterioration degree of the air-fuel ratio sensor 14 is high, the increase speed of the sensor element temperature after the stop of the execution of the preheat control is lower than when the deterioration degree of the air-fuel ratio sensor 14 is low. As a result, when the deterioration degree of the air-fuel ratio sensor 14 is low (solid), the sensor element temperature reaches the predetermined activation temperature Tsa at time t3, and when the deterioration degree of the air-fuel ratio sensor 14 is high to some extent (dash-dot line), the sensor element temperature reaches the predetermined activation temperature Tsa at time t4, which is later than time t3. That is, even if the preheat temperature in the preheat control is identical, a reactivation period dtr' when the deterioration degree of the air-fuel ratio sensor 14 is high to some extent is longer than a reactivation period dtr when the deterioration degree of the air-fuel ratio sensor 14 is relatively low. Therefore, even if the predetermined first preheat temperature Tsp1 is set such that the reactivation period dtr when the deterioration degree of the air-fuel ratio sensor 14 is relatively low is equal to or shorter than the predetermined period, the reactivation period dtr' sometimes becomes longer than the predetermined period when the deterioration degree of the air-fuel ratio sensor 14 is high to some extent.

Hence, in the embodiment, the preheat temperature in the preheat control (hereinafter, also referred to as the "current preheat control") to be executed in connection with the current execution of the automatic stop-restart control is set based on whether the reactivation period when the preheat control (hereinafter, also referred to as the "last preheat control") executed in connection with the last execution of the automatic stop-restart control is stopped is equal to or shorter than the predetermined period. More specifically, whenever the preheat control is executed in connection with the execution of the automatic stop-restart control, the ECU 20 stores the preheat temperature in the preheat control, as a predetermined first preheat temperature, and stores the length of the reactivation period after the stop of the execution of the preheat control, in association with the predetermined first preheat temperature. Then, when the predetermined automatic stop condition is satisfied, the ECU 20 determines whether the reactivation period (hereinafter, also referred to as the "last reactivation period") after the stop of the execution of the last preheat control, which is the reactivation period stored in the ECU 20, is equal to or shorter than the predetermined period. On this occasion, in the case where the last reactivation period stored in the ECU 20 is equal to or shorter than the predetermined period, there is a high possibility that the deterioration degree of the air-fuel ratio sensor 14 remains relatively low. Therefore, even when the preheat temperature in the current preheat control is set again to the predetermined first preheat temperature that is the preheat temperature in the last preheat control, there is a high possibility that the reactivation period after the stop of the execution of the current preheat control is equal to or shorter than the predetermined period. Hence, in the case where the last reactivation period is equal to or shorter than the predetermined period, the preheat temperature in the current preheat control is set again to the predetermined first preheat temperature that is the preheat temperature in the last preheat control. On the other hand, in the case where the predetermined automatic stop condition is satisfied and where the last reactivation period stored in the ECU 20 is longer than the predetermined period, there is a possibility that the deterioration degree of the air-fuel ratio sensor 14 is high to some extent. Therefore, if the preheat temperature in the current preheat control is set to the predetermined first preheat temperature that is the predetermined temperature in the last preheat control, there is a high possibility that the reactivation period after the stop of the execution of the current preheat control also becomes longer than the predetermined period again. Hence, in the case where the last reactivation period is longer than the predetermined period, the preheat temperature in the current preheat control is set to a predetermined second preheat temperature that is higher than the predetermined first preheat temperature.

Thus, in the case where there is a high possibility that the reactivation period after the stop of the execution of the preheat control becomes equal to or shorter than the predetermined period even if the preheat temperature is set to the predetermined first preheat temperature and the preheat control is executed, the preheat temperature in the current preheat control is set to the predetermined first preheat temperature. Thereby, it is possible to increase the effect of decrease in electric power consumption of the battery 54, which is an effect to be obtained by the execution of the preheat control, compared to when the preheat temperature is set to the predetermined second preheat temperature and the preheat control is executed. On the other hand, in the case where there is a high possibility that the reactivation period after the stop of the execution of the preheat control becomes longer than the predetermined period if the preheat temperature is set to the predetermined first preheat temperature and the preheat control is executed, the preheat temperature in the current preheat control is set to the predetermined second preheat temperature that is higher than the predetermined first preheat temperature. Thereby, it is possible to shorten the reactivation period after the stop of the execution of the preheat control, compared to when the preheat temperature is set to the predetermined first preheat temperature and the preheat control is executed. Therefore, it is possible to restrain an excessive increase in the reactivation period after the stop of the execution of the current preheat control. Accordingly, it is possible to restrain the deterioration in exhaust emission at the time of the restart of the internal combustion engine 1.

Flow of Preheat Control

A flow when the preheat control according to the embodiment is executed will be described below, based on a flowchart shown in FIG. 4. During the operation of the internal combustion engine 1, the flow is repeatedly executed at a predetermined interval, by the ECU 20. During the operation of the internal combustion engine 1, a heating control of the heater 14b for maintaining the sensor element temperature of the air-fuel ratio sensor 14 at the predetermined activation temperature is realized when the ECU 20 executes a flow different from the flow shown in FIG. 4.

In the flow, first, in S101, it is determined whether the predetermined automatic stop condition described above is satisfied. In the case where the negative determination is made in S101, the automatic stop-restart control for the internal combustion engine 1 is not executed. Therefore, the preheat control also is not executed. Accordingly, in this case, the execution of the flow is ended once. On the other hand, in the case where the positive determination is made in S101, the process of S102 is executed next. Incidentally, in the case where the positive determination is made in S101, a flow different from the flow shown in FIG. 4 is executed by the ECU 20, and thereby, the automatic stop-restart control for the internal combustion engine 1 is executed. Accordingly, when the positive determination is made in S101, the internal combustion engine 1 is automatically stopped.

In S102, the predetermined first preheat temperature Tsp1 as the preheat temperature in the last preheat control and the last reactivation period dtr, which are stored in the ECU 20, are read. Next, in S103, it is determined whether the last reactivation period dtr read in S102 is equal to or shorter than a predetermined period dtr0. As described above, the predetermined period dtr0 is a period allowing the exhaust emission at the time of the restart of the internal combustion engine 1 to be in a permissible range if the reactivation period is equal to or shorter than the predetermined period dtr0. The predetermined period dtr0 is set based on experiments and the like, and is previously stored in the ECU 20.

In the case where the positive determination is made in S103, the preheat temperature in the current preheat control is set to the predetermined first preheat temperature Tsp1 read in S102, in S104. Next, in S105, the preheat control is executed. In this case, in the preheat control, the electric power supply amount to the heater 14b of the air-fuel ratio sensor 14 is decreased from the predetermined activation supply amount to the predetermined first preheat supply amount corresponding to the predetermined first preheat temperature Tsp1.

Figure 5:
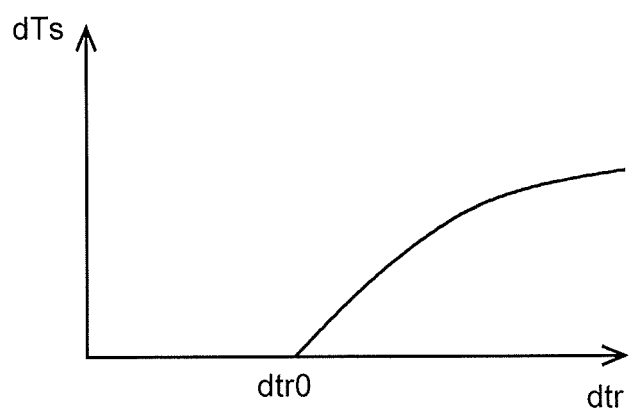
FIG. 5 is a diagram showing a correlation of a predetermined increase amount dTs and a last reactivation period dtr.

On the other hand, in the case where the negative determination is made in S103, the predetermined second preheat temperature Tsp2, next, is calculated in S106. In S106, the predetermined second preheat temperature Tsp2 is calculated by adding a predetermined increase amount dTs to the predetermined first preheat temperature Tsp1 read in S102. On this occasion, the predetermined increase amount dTs is determined based on the last reactivation period dtr read in S102. FIG. 5 is a diagram showing a correlation of the predetermined increase amount dTs and the last reactivation period dtr in the embodiment. In FIG. 5, the abscissa axis indicates the last reactivation period dtr, and the ordinate axis indicates the predetermined increase amount dTs. Further, dtr0 on the abscissa axis in FIG. 5 indicates the predetermined period.

Here, there is a high possibility that the deterioration degree of the air-fuel ratio sensor 14 becomes higher and the increase speed of the sensor element temperature after the stop of the execution of the preheat control becomes lower as the last reactivation period dtr becomes longer. Therefore, for making the reactivation period after the stop of the execution of the current preheat control equal to or shorter than the predetermined period dtr0, it is necessary to set the preheat temperature in the current preheat control to a higher temperature, as the last reactivation period dtr becomes longer. Hence, as shown in FIG. 5, the predetermined increase amount dTs is set to a larger amount, as the last reactivation period dtr becomes longer. Thereby, the predetermined second preheat temperature Tsp2 calculated in S106 becomes higher as the last reactivation period dtr becomes longer. In the embodiment, the correlation of the predetermined increase amount dTs and the last reactivation period dtr shown in FIG. 5 is evaluated based on experiments and the like, and is previously stored in the ECU 20, as a map or a function. In S106, the ECU 20 calculates the predetermined increase amount dTs using the map or the function, and furthermore, calculates the predetermined second preheat temperature Tsp2 by adding the predetermined increase amount dTs to the predetermined first preheat temperature Tsp1. The predetermined increase amount dTs does not always need to be changed continuously depending on the length of the last reactivation period dtr as shown in FIG. 5. That is, the value of the predetermined increase amount dTs may be changed in a stepwise manner depending on the length of the last reactivation period dtr.

Next, in S107, the preheat temperature in the current preheat control is set to the predetermined second preheat temperature Tsp2 calculated in S106. Next, in S105, the preheat control is executed. In this case, in the preheat control, the electric power supply amount to the heater 14b of the air-fuel ratio sensor 14 is decreased from the predetermined activation supply amount to the predetermined second preheat supply amount corresponding to the predetermined second preheat temperature Tsp2.

When the predetermined automatic start condition is satisfied after the preheat control is executed in S105, the internal combustion engine 1 is automatically restarted, and the execution of the predetermined control is stopped. Then, the sensor element temperature is increased to the predetermined activation temperature Tsa.

Time Chart

Figure 6:
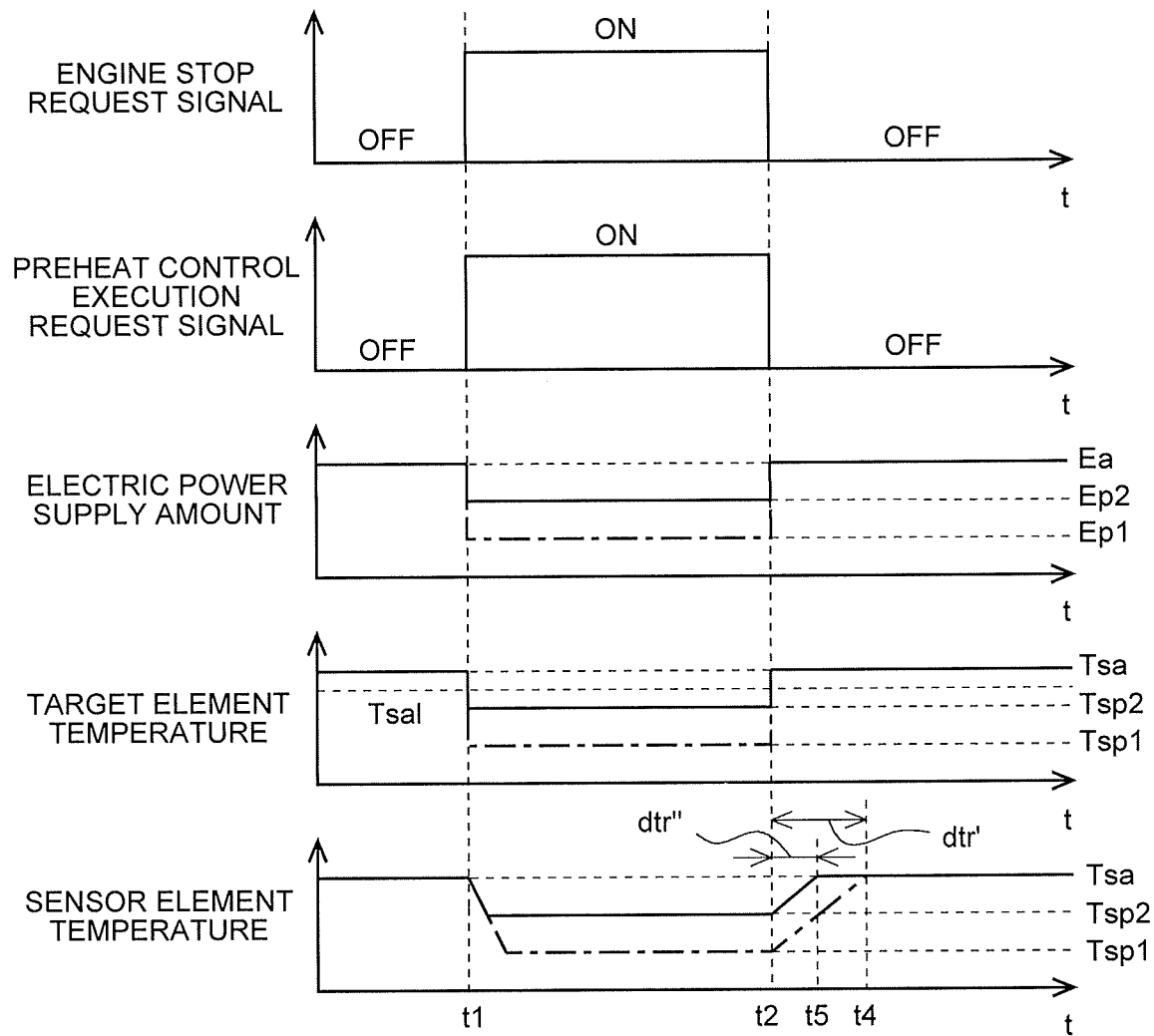
FIG. 6 is a time chart showing changes in the engine stop request signal, the preheat control execution request signal, the electric power supply amount from the battery to the heater, the target element temperature and the sensor element temperature when the preheat control is performed due to execution of the flow shown in FIG. 4.

Next, changes in the engine stop request signal, the preheat control execution request signal, the electric power supply amount from the battery 54 to the heater 14b, the target temperature (target element temperature) of the sensor element 14a and the actual temperature (sensor element temperature) of the sensor element 14a when the preheat control is performed due to the execution of the flow shown in FIG. 4 will be described based on a time chart shown in FIG. 6. In FIG. 6, the changes in the parameters when the preheat control is performed due to the execution of the flow in FIG. 4 in a state where the deterioration degree of the air-fuel ratio sensor 14 is higher to some extent are shown by solid lines. That is, the solid lines in FIG. 6 show the changes in the parameters in the case where the negative determination is made in S103 of the flow shown in FIG. 4 because the last reactivation period dtr is longer than the predetermined period dtr0. Further, dash-dot lines in FIG. 6 show the same changes as the changes in the parameters shown in the time chart of FIG. 3.

In FIG. 6, similarly to the time chart of FIG. 3, at time t1, the predetermined automatic stop condition is satisfied. Therefore, at time t1, the engine stop request signal is turned ON, and the preheat control execution request signal is turned ON. Further, in FIG. 6, similarly to the time chart of FIG. 3, at time t2, the predetermined automatic start condition is satisfied. Therefore, at time t2, the engine stop request signal is turned OFF, and the preheat control execution request signal is turned OFF.

Also in FIG. 6, at time t1, the execution of the preheat control is executed. On this occasion, the preheat temperature is set to the predetermined second preheat temperature Tsp2 that is higher than the predetermined first preheat temperature Tsp1 (see S107 of FIG. 4). Therefore, in FIG. 6, at time t1, the target element temperature is changed from the predetermined activation temperature Tsa to the predetermined second preheat temperature Tsp2. Therewith, at time t1, the electric power supply amount from the battery 54 to the heater 14b is decreased from the predetermined activation supply amount Ea to a predetermined second preheat supply amount Ep2. The predetermined second preheat supply amount Ep2 is an electric power supply amount to the heater 14b for adjusting the sensor element temperature to the predetermined second preheat temperature Tsp2. When the electric power supply amount to the heater 14b is decreased to the predetermined second preheat supply amount Ep2, the sensor element temperature starts to decrease. Then, when a certain amount of time has elapsed since time t1, the sensor element temperature becomes the predetermined second preheat temperature Tsp2.

Thereafter, also in FIG. 6, at time t2, the execution of the preheat control is stopped. Therefore, at time t2, the target element temperature is changed from the predetermined second preheat temperature Tsp2 to the predetermined activation temperature Tsa. Therewith, at time t2, the electric power supply amount from the battery 54 to the heater 14b is increased from the predetermined second preheat supply amount Ep2 to the predetermined activation supply amount Ea. Thereby, at time t2, the sensor element temperature starts to increase. Then, at time t5 when a reactivation period dtr" has elapsed since the stop of the execution of the preheat control at time t2, the sensor element temperature reaches the predetermined activation temperature Tsa. On this occasion, since the preheat temperature in the preheat control is set to the predetermined second preheat temperature Tsp2, the reactivation period dtr" is shorter than the reactivation period dtr' when the preheat temperature in the preheat control is set to the predetermined first preheat temperature Tsp1.

Figure 4:
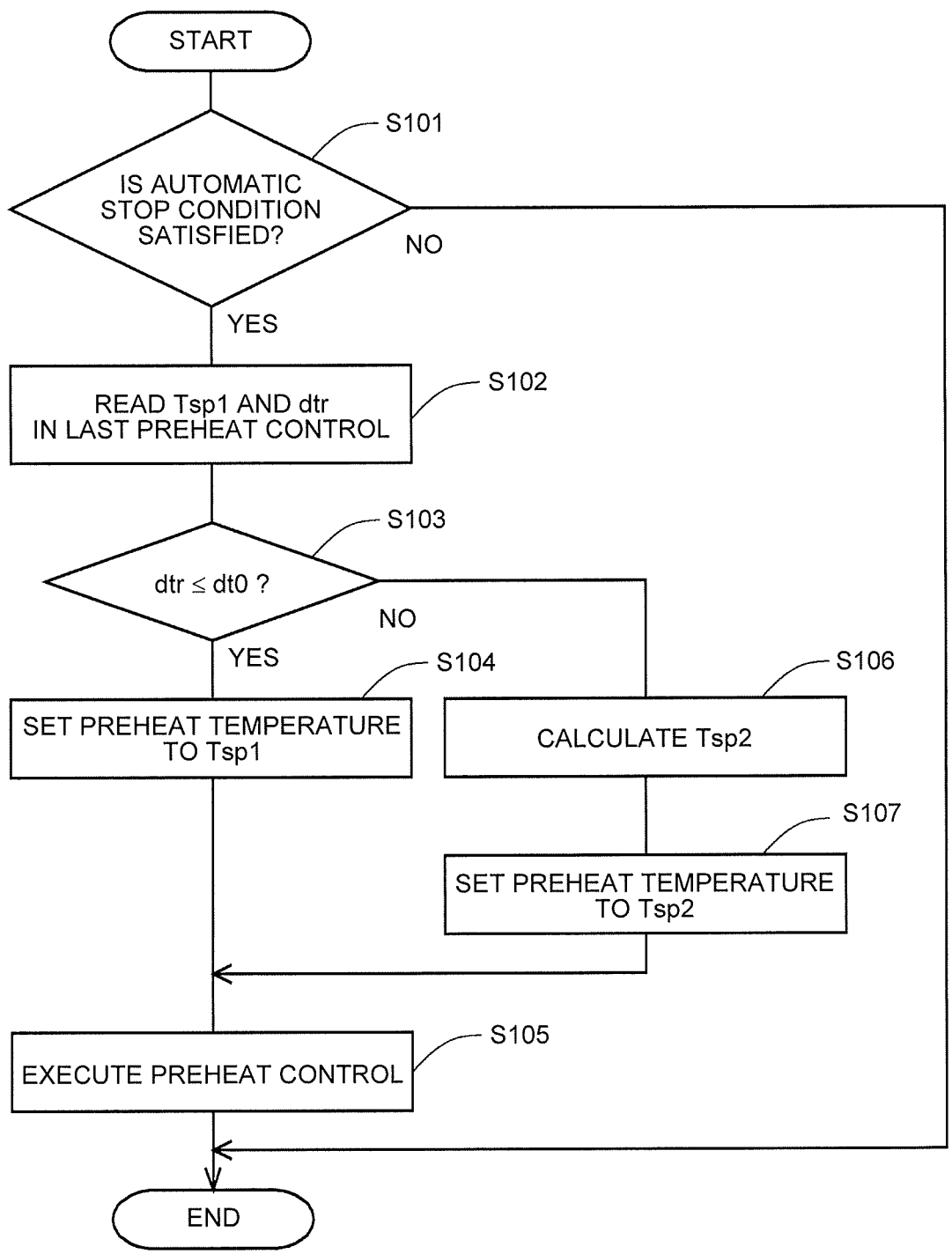
FIG. 4 is a flowchart showing a flow when a preheat control according to a first embodiment is executed.

As described above, by executing the preheat control in accordance with the flow shown in FIG. 4, it is possible to restrain an excessive increase in the reactivation period after the stop of the execution of the preheat control, even when the deterioration degree of the air-fuel ratio sensor 14 is high to some extent. Accordingly, it is possible to make the reactivation period after the stop of the execution of the preheat control equal to or shorter than the predetermined period, even when the deterioration degree of the air-fuel ratio sensor 14 is high to some extent.

Figure 7:
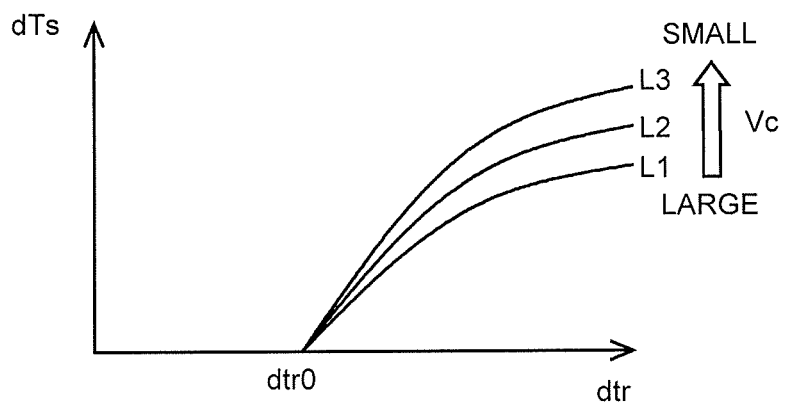
FIG. 7 is a diagram showing a correlation of the predetermined increase amount dTs, the last reactivation period dtr and a stop-time charge amount Vc.

In the flow shown in FIG. 4, the predetermined increase amount dTs relative to the predetermined first preheat temperature Tsp1 for calculating the predetermined second preheat temperature Tsp2 is changed depending on the length of the last reactivation period (see FIG. 5). However, the predetermined increase amount dTs may be a fixed value that is previously determined. Here, as shown in FIG. 7, by increasing the predetermined increase amount dTs as the last reactivation period becomes longer, it is possible to increase the predetermined second preheat temperature Tsp2 that is the preheat temperature in the current preheat control, as the deterioration degree of the air-fuel ratio sensor 14 becomes higher. Therefore, by changing the predetermined increase amount dTs depending on the last reactivation period as shown in the flow of FIG. 4, it is possible to make the reactivation period after the stop of the execution of the current preheat control equal to or shorter than the predetermined period, even when the air-fuel ratio sensor 14 further deteriorates.

Modification

Next, a modification of the preheat control according to the embodiment will be described. As described above, electric power is supplied from the battery 54 to the heater 14b of the air-fuel ratio sensor 14. Then, when the execution of the preheat control is stopped and the sensor element temperature is increased from the preheat temperature to the predetermined activation temperature, the electric power supply amount from the battery 54 to the heater 14b is increased. On this occasion, when the charge amount of the battery 54 is small so that the voltage of the battery 54 is low, the increase speed of the sensor element temperature is low. Therefore, the charge amount of the battery 54 sometimes influences the length of the reactivation period after the stop of the execution of the preheat control. That is, even when the preheat temperature is identical, the reactivation period is likely to become longer, as the charge amount of the battery 54 becomes smaller.

Hence, in the modification, in S106 of the flow shown in FIG. 4, the calculation of the predetermined second preheat temperature Tsp2 is performed in consideration of the charge amount (hereinafter, also referred to as the "stop-time charge amount") of the battery 54 when the predetermined automatic stop condition is satisfied in the current execution of the automatic stop-restart control, in addition to the length of the last reactivation period. That is, the predetermined increase amount dTs relative to the predetermined first preheat temperature Tsp1 is determined based on the last reactivation period and the stop-time charge amount. When the internal combustion engine 1 is automatically stopped due to the satisfaction of the predetermined automatic stop condition, the electric power generation using the output of the internal combustion engine 1 as dynamic power is not performed in the electric generator 53. Therefore, in a period after the internal combustion engine 1 is automatically stopped and before the internal combustion engine 1 is restarted, the charge amount of the battery 54 is unlikely to increase. Accordingly, the charge amount of the battery 54 when the internal combustion engine 1 is restarted is unlikely to become larger than the stop-time charge amount.

FIG. 7 is a diagram showing a correlation of the predetermined increase amount dTs, and the last reactivation period dtr and the stop-time charge amount Vc in the modification. In FIG. 7, the abscissa axis indicates the last reactivation period dtr, and the ordinate axis indicates the predetermined increase amount dTs. Further, dtr0 on the abscissa axis in FIG. 7 indicates the predetermined period. In FIG. 7, L1, L2 and L3 indicate correlations of the predetermined increase amount dTs and the last reactivation period dtr with respect to different stop-time charge amounts, respectively. Here, the stop-time charge amount becomes smaller in the order of L1, L2 and L3.

As described above, in the case where the preheat temperature is identical, the reactivation period is likely to become longer, as the charge amount of the battery 54 become smaller. Therefore, for making the reactivation period after the stop of the execution of the current preheat control equal to or shorter than the predetermined dtr0, on the assumption that the last reactivation period dtr is identical, the preheat temperature in the current preheat control is set to a higher temperature, as the stop-time charge amount Vc becomes smaller. Hence, as shown in FIG. 7, if the last reactivation period dtr is identical, the predetermined increase amount dTs is set to a larger amount, as the stop-time charge amount Vc becomes smaller. Thereby, the predetermined second preheat temperature Tsp2 calculated in S106 becomes a higher temperature, as the last reactivation period dtr becomes longer if the stop-time charge amount Vc is identical, or as the stop-time charge amount Vc becomes smaller if the last reactivation period dtr is identical.

In the modification, as shown in FIG. 7, the correlation of the predetermined increase amount dTs, the last reactivation period dtr and the stop-time charge amount Vc is evaluated based on experiments and the like, and is previously stored in the ECU 20, as a map or a function. In S106, the ECU 20 calculates the predetermined increase amount dTs using the map or the function, and furthermore, calculates the predetermined second preheat temperature Tsp2 by adding the predetermined increase amount dTs to the predetermined first preheat temperature Tsp1.

In the modification, in the case where the last reactivation period dtr is longer than the predetermined period dtr0, the preheat temperature in the current preheat control is set to the predetermined second preheat temperature Tsp2 calculated as described above. Thereby, even in the case where the deterioration degree of the air-fuel ratio sensor 14 is high to some extent and where the stop-time charge amount is relatively low, it is possible to restrain an excessive increase in the reactivation period.

Second Embodiment

A schematic configuration of a hybrid system and an intake and exhaust system of an internal combustion engine according to the embodiment is the same as the schematic configuration in the first embodiment. Also in the embodiment, when the ECU 20 executes the automatic stop-restart control for the internal combustion engine 1, the ECU 20 executes the preheat control for the air-fuel ratio sensor 14. In the embodiment, the preheat temperature in the preheat control is set based on the stop-time charge amount that is the charge amount of the battery 54 when the predetermined automatic stop condition is satisfied in the execution of the automatic stop-restart control.

As described above, even when the preheat temperature is identical, the reactivation period is likely to become longer, as the charge amount of the battery 54 becomes smaller. Hence, in the embodiment, the preheat temperature in the current preheat control is set based on whether the stop-time charge amount in the current execution of the automatic stop-restart control is equal to or larger than a predetermined charge amount. More specifically, when the predetermined automatic stop condition is satisfied, it is determined whether the charge amount of the battery 54 at the current time, that is, the stop-time charge amount is equal to or larger than a predetermined charge amount. The predetermined charge amount is set to a charge amount at which the reactivation period after the stop of the execution of the preheat control becomes equal to or shorter than the predetermined period in the case where the air-fuel ratio sensor 14 is in the normal state, where the charge amount of the battery 54 is equal to or larger than the predetermined charge amount and where the preheat temperature is set to the predetermined first preheat temperature and the preheat control is executed. Here, the predetermined period is a period allowing the exhaust emission at the time of the restart of the internal combustion engine 1 to be in a permissible range if the reactivation period is equal to or shorter than the predetermined period, similarly to the predetermined period in the preheat control according to the first embodiment.

In the case where the stop-time charge amount is equal to or larger than the predetermined charge amount, there is a high possibility that the reactivation period after the stop of the execution of the current preheat control becomes equal to or shorter than the predetermined period even if the preheat temperature in the current preheat control is set to the predetermined first preheat temperature. Hence, in the case where the stop-time charge amount is equal to or larger than the predetermined charge amount, the preheat temperature in the current preheat control is set to the predetermined first preheat temperature. On the other hand, in the case where the stop-time charge amount is smaller than the predetermined charge amount, if the preheat temperature in the current preheat control is set to the predetermined first preheat temperature, there is a high possibility that the reactivation period becomes longer than the predetermined period due to an insufficient voltage of the battery 54 when the sensor element temperature is increased to the predetermined activation temperature after the stop of the execution of the current preheat control. Hence, in the case where the stop-time charge amount is smaller than the predetermined charge amount, the preheat temperature in the current preheat control is set to the predetermined second preheat temperature that is higher than the predetermined first preheat temperature.

Thus, in the case where there is a high possibility that the reactivation period after the stop of the execution of the preheat control becomes equal to or shorter than the predetermined period even if the preheat temperature is set to the predetermined first preheat temperature and the preheat control is executed, the preheat temperature in the current preheat control is set to the predetermined first preheat temperature. Thereby, it is possible to increase the effect of the decrease in the electric power consumption of the battery 54, which is an effect to be obtained by the execution of the preheat control, compared to when the preheat temperature is set to the predetermined second preheat temperature and the preheat control is executed. Further, also in the preheat control according to the embodiment, in the case where there is a high possibility that the reactivation period after the stop of the execution of the preheat control becomes longer than the predetermined period if the preheat temperature is set to the predetermined first preheat temperature and the preheat control is executed, the preheat temperature in the current preheat control is set to the predetermined second preheat temperature that is higher than the predetermined first preheat temperature. Thereby, it is possible to shorten the reactivation period after the stop of the execution of the preheat control, compared to when the preheat temperature is set to the predetermined first preheat temperature and the preheat control is executed. Therefore, it is possible to restrain an excessive increase in the reactivation period after the stop of the execution of the current preheat control. Accordingly, it is possible to restrain the deterioration in exhaust emission at the time of the restart of the internal combustion engine 1.

Flow of Preheat Control

A flow when the preheat control according to the embodiment is executed will be described below, based on a flowchart shown in FIG. 8. During the operation of the internal combustion engine 1, the flow is repeatedly executed at a predetermined interval, by the ECU 20. In the flow, in S201, it is determined whether the predetermined automatic stop condition is satisfied, similarly to S101 of the flow shown in FIG. 4. In the case where the negative determination is made in S201, the execution of the flow is ended once. On the other hand, in the case where the positive determination is made in S201, the process of S202 is executed next.

In S202, the charge amount (stop-time charge amount) Vc of the battery 54 at the current time is read. A flow different from the flow shown in FIG. 8 is executed by the ECU 20, and thereby, the charge amount of the battery 54 is constantly calculated. Next, in S203, it is determined whether the stop-time charge amount Vc read in S202 is equal to or larger than a predetermined charge amount Vc0. As describe above, the predetermined charge amount Vc0 is a charge amount at which the reactivation period after the stop of the execution of the preheat control becomes equal to or shorter than the predetermined period dtr0 in the case where the air-fuel ratio sensor 14 is in the normal state, where the charge amount of the battery 54 is equal to or larger than the predetermined charge amount Vc0 and where the preheat temperature is set to the predetermined first preheat temperature and the preheat control is executed. This predetermined charge amount Vc0 is determined based on experiments and the like, and is previously stored in the ECU 20.

In the case where the positive determination is made in S203, the preheat temperature in the current preheat control, next, is set to a predetermined first preheat temperature Tsp1', in S204. In the preheat control according to the embodiment, the predetermined first preheat control Tsp1' may be a fixed value that is previously determined. Next, in S205, the preheat control is executed. In this case, in the preheat control, the electric power supply amount to the heater 14b of the air-fuel ratio sensor 14 is decreased from the predetermined activation supply amount to the predetermined first preheat supply amount corresponding to the predetermined first preheat temperature Tsp1'.

Figure 9:
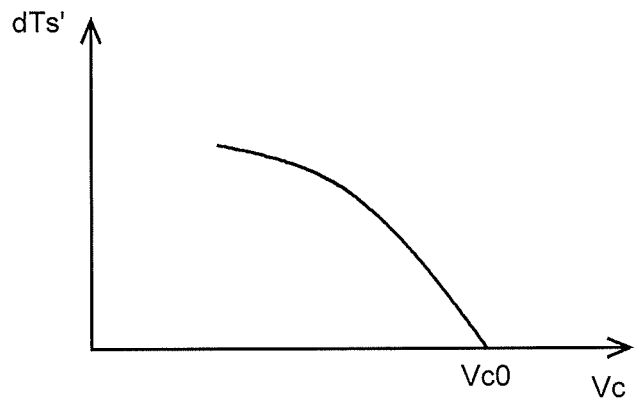
FIG. 9 is a diagram showing a correlation of a predetermined increase amount dTs' and the stop-time charge amount Vc.

On the other hand, in the case where the negative determination is made in S203, a predetermined second preheat temperature Tsp2', next, is calculated in S206. In S206, the predetermined second preheat temperature Tsp2' is calculated by adding a predetermined increase amount dTs' to the predetermined first preheat temperature Tsp1'. On this occasion, the predetermined increase amount dTs' is determined based on the stop-time charge amount Vc read in S202. FIG. 9 is a diagram showing a correlation of the predetermined increase amount dTs' and the stop-time charge amount Vc in the embodiment. In FIG. 9, the abscissa axis indicates the stop-time charge amount Vc, and the ordinate axis indicates the predetermined increase amount dTs'. Further, Vc0 on the abscissa axis in FIG. 9 indicates the predetermined charge amount.

Here, there is a high possibility that the voltage of the battery 54 becomes lower and the increase speed of the sensor element temperature after the stop of the execution of the preheat control becomes lower as the stop-time charge amount Vc becomes smaller. Therefore, for making the reactivation period after the stop of the execution of the current preheat control equal to or shorter than the predetermined period dtr0, it is necessary to set the preheat temperature in the current preheat control to a higher temperature, as the stop-time charge amount Vc becomes smaller. Hence, as shown in FIG. 9, the predetermined increase amount dTs' is set to a larger amount, as the stop-time charge amount Vc becomes smaller. Thereby, the predetermined second preheat temperature Tsp2' calculated in S206 becomes a higher temperature, as the stop-time charge amount Vc becomes smaller. In the embodiment, the correlation of the predetermined increase amount dTs' and the stop-time charge amount Vc shown in FIG. 9 is evaluated based on experiments and the like, and is previously stored in the ECU 20, as a map or a function. In S206, the ECU 20 calculates the predetermined increase amount dTs' using the map or the function, and furthermore, calculates the predetermined second preheat temperature Tsp2' by adding the predetermined increase amount dTs' to the predetermined first preheat temperature Tsp1'. The predetermined increase amount dTs' does not always need to be changed continuously depending on the stop-time charge amount Vc as shown in FIG. 9. That is, the value of predetermined increase amount dTs' may be changed in a stepwise manner depending on the stop-time charge amount Vc.

Next, in S207, the preheat temperature in the current preheat control is set to the predetermined second preheat temperature Tsp2' calculated in S206. Next, in S205, the preheat control is executed. In this case, in the preheat control, the electric power supply amount to the heater 14b of the air-fuel ratio sensor 14 is increased from the predetermined activation supply amount to the predetermined second preheat supply amount corresponding to the predetermined second preheat temperature Tsp2'.

Figure 8:
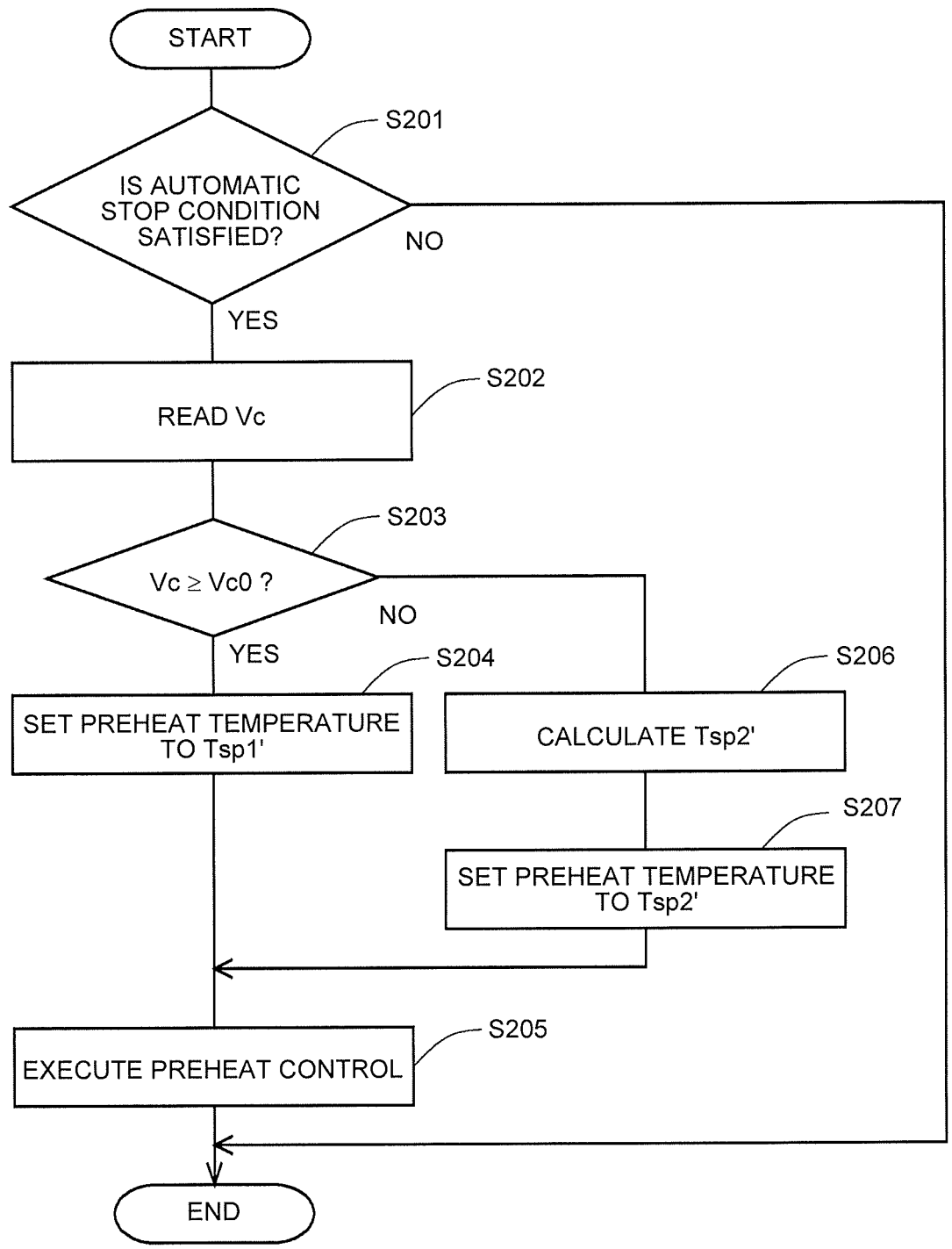
FIG. 8 is a flowchart showing a flow when a preheat control according to a second embodiment is executed.

By executing the preheat control in accordance with the flow shown in FIG. 8, it is possible to restrain an excessive increase in the reactivation period after the stop of the execution of the preheat control, even when the charge amount of the battery 54 is relatively small. Accordingly, it is possible to make the reactivation period after the stop of the execution of the preheat control equal to or shorter than the predetermined period, even when the charge amount of the battery 54 is relatively small.

In the flow shown in FIG. 8, the predetermined increase amount dTs' relative to the predetermined first preheat temperature Tsp1' for calculating the predetermined second preheat temperature Tsp2' is changed depending on the stop-time charge amount (see FIG. 9). However, the predetermined increase amount dTs' may be a fixed value that is previously determined. Here, as shown in FIG. 9, by increasing the predetermined increase amount dTs' as the stop-time charge amount becomes smaller, it is possible to increase the predetermined second preheat temperature Tsp2' that is the preheat temperature in the current preheat control, as the voltage of the battery 54 becomes lower. Therefore, it is possible to make the reactivation period after the stop of the execution of the current preheat control equal to or shorter than the predetermined period, even when the voltage of the battery 54 is low.

Third Embodiment

A schematic configuration of a hybrid system and an intake and exhaust system of an internal combustion engine according to the embodiment is the same as the schematic configuration in the first embodiment. Also in the embodiment, when the ECU 20 executes the automatic stop-restart control for the internal combustion engine 1, the ECU 20 executes the preheat control for the air-fuel ratio sensor 14. In the embodiment, whether the preheat control is executed in the current execution of the automatic stop-restart control is determined based on whether the reactivation period (the last reactivation period) when the last preheat control is stopped is equal to or shorter than the predetermined period.

Flow of Preheat Control

Figure 10:
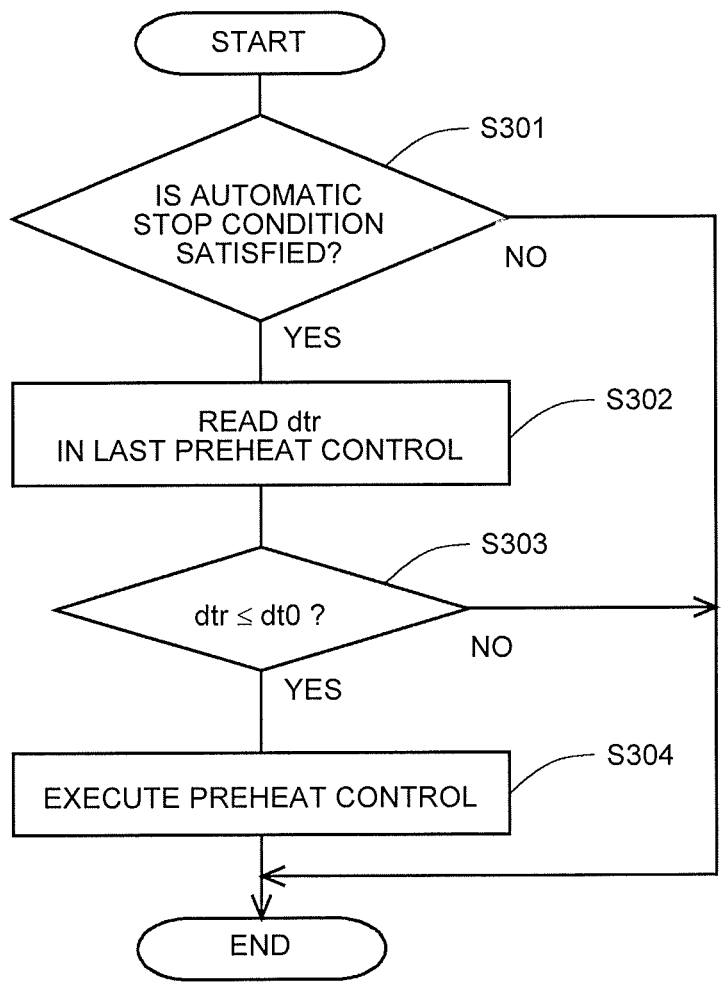
FIG. 10 is a flowchart showing a flow when a preheat control according to a third embodiment is executed.

A flow when the preheat control according to the embodiment is executed will be described below, based on a flowchart shown in FIG. 10. During the operation of the internal combustion engine 1, the flow is repeatedly executed at a predetermined interval, by the ECU 20. In the flow, in S301, it is determined whether the predetermined automatic stop condition is satisfied, similarly to S101 of the flow shown in FIG. 4. In the case where the negative determination is made in S301, the execution of the flow is ended once. On the other hand, in the case where the positive determination is made in S301, the process of S302 is executed next.

In S302, the last reactivation period dtr stored in the ECU 20 is read. Next, in S303, it is determined whether the last reactivation period dtr read in S302 is equal to or shorter than the predetermined period dtr0. In the case where the positive determination is made in S303, the preheat control, next, is executed in S304. In the embodiment, the preheat temperature in the preheat control may be a fixed value that is previously determined. On the other hand, in the case where the negative determination is made in S303, the execution of the flow is ended once. In this case, the preheat control is not executed. That is, the execution of the heating control of the heater 14b for maintaining the sensor element temperature of the air-fuel ratio sensor 14 at the predetermined activation temperature is continued.

In the flow, only in the case where the last reactivation period is equal to or shorter than the predetermined period, that is, only in the case where there is a high possibility that the deterioration degree of the air-fuel ratio sensor 14 remains relatively low, the preheat control is executed. Accordingly, also in the embodiment, it is possible to restrain the deterioration in fuel efficiency in connection with the electric power supply to the heater 14b of the air-fuel ratio sensor 14 as much as possible, and to restrain an excessive increase in the reactivation period when the execution of the preheat control for the air-fuel ratio sensor 14 is stopped at the time of the restart of the internal combustion engine 1.

Fourth Embodiment

A schematic configuration of a hybrid system and an intake and exhaust system of an internal combustion engine according to the embodiment is the same as the schematic configuration in the first embodiment. Also in the embodiment, when the ECU 20 executes the automatic stop-restart control for the internal combustion engine 1, the ECU 20 executes the preheat control for the air-fuel ratio sensor 14. In the embodiment, whether the preheat control is executed in the current execution of the automatic stop-restart control is determined based on whether the charge amount (stop-time charge amount) of the battery 54 when the predetermined automatic stop condition is satisfied in the current execution of the automatic stop-restart control is equal to or larger than the predetermined charge amount.

Flow of Preheat Control

Figure 11:
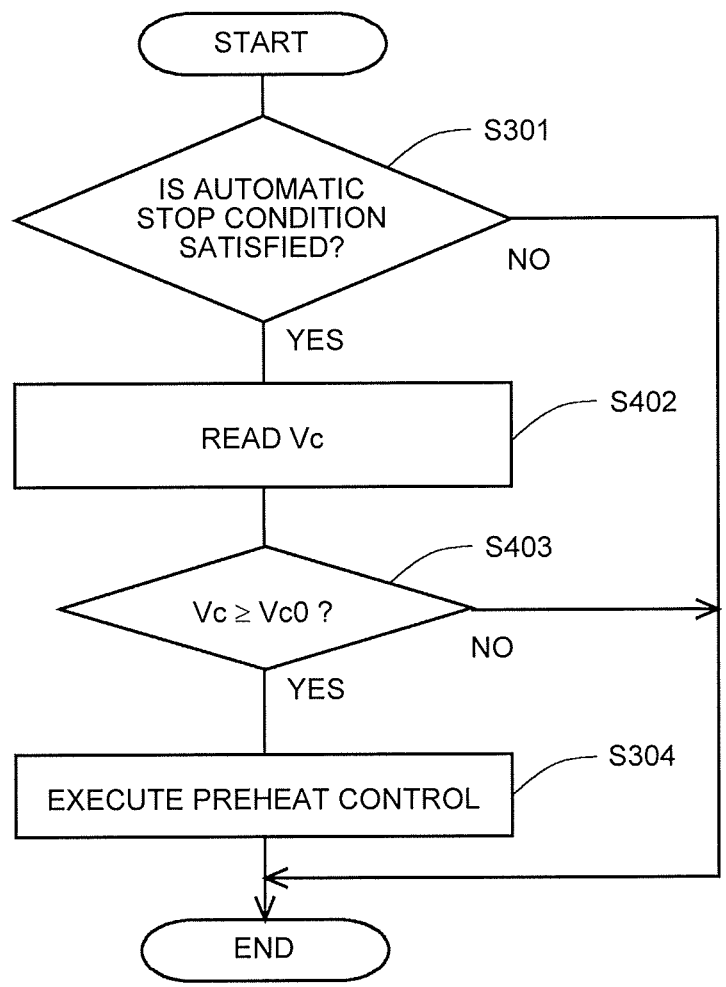
FIG. 11 is a flowchart showing a flow when a preheat control according to a fourth embodiment is executed.

A flow when the preheat control according to the embodiment is executed will be described below, based on a flowchart shown in FIG. 11. During the operation of the internal combustion engine 1, the flow is repeatedly executed at a predetermined interval, by the ECU 20. The processes of S301 and S304 in the flow are the same as the processes of S301 and S304 in the flowchart shown in FIG. 10. Therefore, descriptions of these steps are omitted.

In the flow, in the case where the positive determination is made in S301, the process of S402 is executed next. In S402, the charge amount (stop-time charge amount) Vc of the battery 54 at the current time is read, similarly to S202 of the flow shown in FIG. 8. Next, in S403, it is determined whether the stop-time charge amount Vc read in S402 is equal to or shorter than the predetermined charge amount Vc0. In the case where the positive determination is made in S403, the preheat control, next, is executed in S304. In the embodiment, the preheat temperature in the preheat control may be a fixed value that is previously determined. On the other hand, in the case where the negative determination is made in S403, the execution of the flow is ended once. In the case, the preheat control is not executed. That is, the execution of the heating control of the heater 14b for maintaining the sensor element temperature of the air-fuel ratio sensor 14 at the predetermined activation temperature is continued.

In the flow, only in the case where the stop-time charge amount is equal to or larger than the predetermined charge amount, that is, only in the case where the voltage of the battery 54 is sufficiently high, the preheat control is executed. Accordingly, also in the embodiment, it is possible to restrain the deterioration in fuel efficiency in connection with the electric power supply to the heater 14b of the air-fuel ratio sensor 14 as much as possible, and to restrain an excessive increase in the reactivation period when the execution of the preheat control for the air-fuel ratio sensor 14 is stopped at the time of the restart of the internal combustion engine 1.

OTHER EMBODIMENTS

In the first to fourth embodiments, the case where the sensor system according to the disclosure is applied to the internal combustion engine constituting the hybrid system has been described. However, the automatic stop-restart control is sometimes executed also in an internal combustion engine other than the internal combustion engine constituting the hybrid system. For example, in a vehicle that uses only an internal combustion engine as the dynamic power source, the automatic stop-restart control is sometimes executed for the internal combustion engine, in the case of satisfaction of a predetermined automatic stop condition such as a condition that the accelerator operation amount detected by the accelerator operation amount sensor is zero, a condition that a brake pedal of the vehicle is pressed, or a condition that the vehicle speed is equal to or lower than a predetermined speed. Thus, the sensor system according to the disclosure can be applied even to an internal combustion engine other than the internal combustion engine constituting the hybrid system, and can be applied to any internal combustion engine for which the automatic stop-restart control is executed.

What is claimed is:

1. A sensor system to be applied to an internal combustion engine for which an automatic stop-restart control is performed, the automatic stop-restart control being a control of automatically stopping the internal combustion engine when a predetermined automatic stop condition is satisfied and then automatically restarting the internal combustion engine when a predetermined automatic start condition is satisfied, the sensor system comprising:

an exhaust gas sensor provided in an exhaust passage of the internal combustion engine, the exhaust gas sensor including a heater configured to heat a sensor element of the exhaust gas sensor; and a control unit configured to:

while the internal combustion engine is stopped by the automatic stop-restart control, execute a preheat control of adjusting a temperature of the sensor element to a preheat temperature by decreasing an electric power supply amount to the heater, the preheat temperature being lower than a predetermined activation temperature; and when the predetermined automatic start condition is satisfied, stop execution of the preheat control and increase the temperature of the sensor element to the predetermined activation temperature, wherein the control unit is further configured to:

based on a last execution of the automatic stop-restart control, determine whether or not a predetermined delay condition has been satisfied, the predetermined delay condition being a condition that a reactivation period from the stop of the execution of the preheat control due to satisfaction of the predetermined automatic start condition to a time when the temperature of the sensor element reaches the predetermined activation temperature is longer than a predetermined period when the control unit sets the preheat temperature to a predetermined first preheat temperature and executes the preheat control, wherein when the predetermined automatic stop condition is satisfied and the predetermined delay condition has not been satisfied, the control unit sets the preheat temperature to the predetermined first preheat temperature in a current execution of the automatic stop-restart control; and when the predetermined automatic stop condition is satisfied and the predetermined delay condition has been satisfied, the control unit sets the preheat temperature to a predetermined second preheat temperature that is higher than the predetermined first preheat temperature in the current execution of the automatic stop-restart control.

2. The sensor system according to claim 1, wherein:
the predetermined first preheat temperature is the preheat temperature in the preheat control executed in the last execution of the automatic stop-restart control; and
the predetermined delay condition is when the reactivation period is longer than the predetermined period in the last execution of the automatic stop-restart control.

3. The sensor system according to claim 2, wherein when the control unit sets the preheat temperature to the predetermined second preheat temperature and executes the preheat control, the control unit sets an increase amount of the predetermined second preheat temperature relative to the predetermined first preheat temperature to be larger when the reactivation period is relatively long, or sets the increase amount of the predetermined second preheat temperature relative to the predetermined first preheat temperature to be smaller when the reactivation period is relatively short.

4. The sensor system according to claim 3, wherein the control unit is further configured to:
acquire a charge amount of a battery that supplies the electric power supply amount to the heater, wherein:
when the predetermined automatic stop condition is satisfied and the predetermined delay condition has been satisfied, the control unit sets the increase amount of the predetermined second preheat temperature relative to the predetermined first preheat temperature based on the charge amount of the battery when the predetermined automatic stop condition is satisfied in the current execution of the automatic stop-restart control and a length of the reactivation period in the last execution of the automatic stop-restart control, and such that the control unit sets the increase amount of the predetermined second preheat temperature relative to the predetermined first preheat temperature to be larger when the charge amount of the battery acquired when the predetermined automatic stop condition is satisfied in the current execution of the automatic stop-restart control is relatively small, or sets the increase amount of the predetermined second preheat temperature relative to the predetermined first preheat temperature to be smaller when the charge amount of the battery acquired when the predetermined automatic stop condition is satisfied in the current execution of the automatic stop-restart control is relatively large.

5. A sensor system to be applied to an internal combustion engine for which an automatic stop-restart control is performed, the automatic stop-restart control being a control of automatically stopping the internal combustion engine when a predetermined automatic stop condition is satisfied and then automatically restarting the internal combustion engine when a predetermined automatic start condition is satisfied, the sensor system comprising:
an exhaust gas sensor provided in an exhaust passage of the internal combustion engine, the exhaust gas sensor including a heater configured to heat a sensor element of the exhaust gas sensor; and
a control unit configured to:
while the internal combustion engine is stopped by the automatic stop-restart control, execute a preheat control of adjusting a temperature of the sensor element to a preheat temperature by decreasing an electric power supply amount to the heater, the preheat temperature being lower than a predetermined activation temperature; and
when the predetermined automatic start condition is satisfied, stop execution of the preheat control and increase the temperature of the sensor element to the predetermined activation temperature,
wherein the control unit is further configured to:
based on a last execution of the automatic stop-restart control, determine whether or not a predetermined delay condition has been satisfied, the predetermined delay condition being a condition that a reactivation period from the stop of the execution of the preheat control due to satisfaction of the predetermined automatic start condition to a time when the temperature of the sensor element reaches the predetermined activation temperature is longer than a predetermined period when the control unit executes the preheat control, wherein
when the predetermined automatic stop condition is satisfied and the predetermined delay condition has not been satisfied, the control unit executes the preheat control in a current execution of the automatic stop-restart control; and
when the predetermined automatic stop condition is satisfied and the predetermined delay condition has been satisfied, the control unit does not execute the preheat control in the current execution of the automatic stop-restart control.

6. The sensor system according to claim 5, wherein the predetermined delay condition is when the reactivation period is longer than the predetermined period in the last execution of the automatic stop-restart control.

7. A sensor system to be applied to an internal combustion engine for which an automatic stop-restart control is performed, the automatic stop-restart control being a control of automatically stopping the internal combustion engine when a predetermined automatic stop condition is satisfied and then automatically restarting the internal combustion engine when a predetermined automatic start condition is satisfied, the sensor system comprising:
an exhaust gas sensor provided in an exhaust passage of the internal combustion engine, the exhaust gas sensor including a heater configured to heat a sensor element of the exhaust gas sensor; and
a control unit configured to:
while the internal combustion engine is stopped by the automatic stop-restart control, execute a preheat control of adjusting a temperature of the sensor element to a preheat temperature by decreasing an electric power supply amount to the heater, the preheat temperature being lower than a predetermined activation temperature;
when the predetermined automatic start condition is satisfied, stop execution of the preheat control and increase the temperature of the sensor element to the predetermined activation temperature; and
acquire a charge amount of a battery that supplies the electric power supply amount to the heater,
wherein the control unit is further configured to:
determine whether or not a predetermined delay condition has been satisfied, the predetermined delay condition being a condition that the charge amount of the battery acquired when the predetermined automatic stop condition is satisfied in a current execution of the automatic stop-restart control is smaller than a predetermined charge amount, wherein when the predetermined automatic stop condition is satisfied and the predetermined delay condition has not been satisfied, the control unit executes the preheat control in the current execution of the automatic stop-restart control; and when the predetermined automatic stop condition is satisfied and the predetermined delay condition has been satisfied, the control unit does not execute the preheat control in the current execution of the automatic stop-restart control.

* * * * *